(12) United States Patent
Trintchouk et al.

(10) Patent No.: US 11,415,515 B2
(45) Date of Patent: Aug. 16, 2022

(54) SYSTEMS AND METHODS FOR MULTICOLOR IMAGING

(71) Applicant: Singular Genomics Systems, Inc., La Jolla, CA (US)

(72) Inventors: Fedor Trintchouk, San Diego, CA (US); Eli N. Glezer, Del Mar, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 0 days.

(21) Appl. No.: 17/703,720

(22) Filed: Mar. 24, 2022

(65) Prior Publication Data

US 2022/0214278 A1 Jul. 7, 2022

Related U.S. Application Data

(63) Continuation of application No. PCT/US2021/064423, filed on Dec. 20, 2021.
(Continued)

(51) Int. Cl.
| | |
|---|---|
| *G01N 21/64* | (2006.01) |
| *H04N 5/225* | (2006.01) |
| *H04N 9/04* | (2006.01) |
| *H04N 9/097* | (2006.01) |
| *G02B 21/16* | (2006.01) |
| *G02B 21/26* | (2006.01) |
| *G02B 21/08* | (2006.01) |

(Continued)

(52) U.S. Cl.
CPC ..... *G01N 21/6456* (2013.01); *G01N 21/6428* (2013.01); *G02B 21/082* (2013.01); *G02B 21/16* (2013.01); *G02B 21/18* (2013.01); *G02B 21/26* (2013.01); *G02B 27/1013* (2013.01); *H04N 5/2256* (2013.01); *H04N 5/2258* (2013.01); *H04N 9/0451* (2018.08); *H04N 9/097* (2013.01); *G01N 2201/103* (2013.01)

(58) Field of Classification Search
CPC .......... G01N 21/6456; G01N 21/6428; G01N 2201/103; G02B 21/082; G02B 21/16; G02B 21/18; G02B 21/26; G02B 27/1013; H04N 5/2256; H04N 5/2258; H04N 9/0451; H04N 9/097
See application file for complete search history.

(56) References Cited

U.S. PATENT DOCUMENTS

| | | |
|---|---|---|
| 5,847,400 A | 12/1998 | Kain et al. |
| 7,057,026 B2 | 6/2006 | Barnes et al. |

(Continued)

FOREIGN PATENT DOCUMENTS

| | | |
|---|---|---|
| WO | WO-2004/018497 A2 | 3/2004 |
| WO | WO-2004/018497 A3 | 3/2004 |

(Continued)

OTHER PUBLICATIONS

Arce, S.H. et al. (2013). "Fast and accurate automated cell boundary determination for fluorescence microscopy," *Sci Rep* 3:2266.
(Continued)

*Primary Examiner* — Marcus H Taningco
(74) *Attorney, Agent, or Firm* — Mintz Levin Cohn Ferris Glovsky and Popeo, P.C.

(57) ABSTRACT

Disclosed herein, inter alia, are methods and systems of image analysis useful for rapidly identifying and/or quantifying features.

31 Claims, 2 Drawing Sheets

Related U.S. Application Data

(60) Provisional application No. 63/128,477, filed on Dec. 21, 2020.

(51) Int. Cl.
*G02B 21/18* (2006.01)
*G02B 27/10* (2006.01)

(56) References Cited

U.S. PATENT DOCUMENTS

| | | | |
|---|---|---|---|
| 7,541,444 B2 | 6/2009 | Milton et al. | |
| 8,039,817 B2 | 10/2011 | Feng et al. | |
| 8,241,573 B2 | 8/2012 | Banerjee et al. | |
| 10,738,072 B1 | 8/2020 | Graham et al. | |
| 2002/0088940 A1* | 7/2002 | Watanabe | H01J 37/224 250/310 |
| 2005/0214863 A1 | 9/2005 | McDevitt et al. | |
| 2008/0149855 A1* | 6/2008 | Mehta | G01N 21/6452 250/492.1 |
| 2009/0026082 A1 | 1/2009 | Rothberg et al. | |
| 2010/0193704 A1* | 8/2010 | Pratt | G01N 21/6428 250/459.1 |
| 2010/0273208 A1* | 10/2010 | Takenaka | C12M 41/36 435/288.7 |
| 2011/0278470 A1* | 11/2011 | Bouzid | G01J 1/58 250/459.1 |
| 2012/0270305 A1 | 10/2012 | Reed et al. | |
| 2013/0004954 A1* | 1/2013 | Bianchessi | G01N 21/6428 435/6.12 |
| 2013/0038931 A1* | 2/2013 | Shirota | G02B 21/26 359/392 |
| 2014/0066318 A1 | 3/2014 | Frisen et al. | |
| 2014/0087474 A1* | 3/2014 | Huber | G01N 21/6428 436/94 |
| 2014/0152888 A1* | 6/2014 | Staker | G02B 27/646 348/373 |
| 2014/0198313 A1 | 7/2014 | Tracy et al. | |
| 2018/0011021 A1* | 1/2018 | Shoji | G01J 3/36 |
| 2018/0258472 A1 | 9/2018 | Glezer | |
| 2019/0191974 A1 | 6/2019 | Talbert et al. | |
| 2019/0219794 A1 | 7/2019 | Chamberlin et al. | |
| 2021/0055222 A1* | 2/2021 | Katzlinger | G01N 21/6428 |

FOREIGN PATENT DOCUMENTS

| | | | |
|---|---|---|---|
| WO | WO-2007/123744 A2 | 11/2007 | |
| WO | WO-2007/123744 A3 | 11/2007 | |

OTHER PUBLICATIONS

Beattie, W.G. et al. (Dec. 1995). "Hybridization of DNA targets to glass-tethered oligonucleotide probes," *Molecular Biotechnology* 4(3):213-225.

Bentley, D.R. et al. (Nov. 6, 2008). "Accurate whole human genome sequencing using reversible terminator chemistry," *Nature* 456(7218):53-59.

Carpenter, A. E. et al. (2006, e-published Oct. 31, 2016). "CellProfiler: image analysis software for identifying and quantifying cell phenotypes," *Genome Biology* 7(10):R100.

International Search Report dated Mar. 8, 2022, for PCT Application No. PCT/US2021/064423, filed Dec. 20, 2021, 4 pages.

Lugagne, J-B. et al. (Jul. 30, 2018). "Identification of individual cells from z-stacks of bright-field microscopy images," *Sci Rep* 8(1):11455.

Magaki, S. et al. (2019). "An Introduction to the Performance of Immunohistochemistry," *Methods Molecular Biology* 1897, 289-298.

Pattarone, G., et al. (May 13, 2021). "Learning deep features for dead and living breast cancer cell classification without staining," *Sci Rep* 11(1):10304.

Pourmand, N. et al. (Apr. 25, 2006, e-published Apr. 13, 2006). "Direct electrical detection of DNA synthesis," *PNAS USA* 103(17): 6466-6470.

Shendure, J. et al. (Sep. 9, 2005, e-published Aug. 4, 2005). "Accurate multiplex polony sequencing of an evolved bacterial genome," *Science* 309(5741):1728-1732.

Written Opinion dated Mar. 8, 2022, for PCT Application No. PCT/US2021/064423, filed Dec. 20, 2021, 8 pages.

\* cited by examiner

SYSTEMS AND METHODS FOR MULTICOLOR IMAGING

CROSS-REFERENCES TO RELATED APPLICATIONS

This application is a continuation of PCT/US2021/064423, filed Dec. 20, 2021, which claims the benefit of U.S. Provisional Application No. 63/128,477, filed Dec. 21, 2020, which are incorporated herein by reference in their entirety and for all purposes.

BACKGROUND

Next generation sequencing (NGS) methods typically rely on the detection of genomic fragments immobilized on an array. For example, in sequencing-by-synthesis (SBS), fluorescently labeled nucleotides are added to an array of polynucleotide primers and are detected upon incorporation. The extension of the nucleic acid primer along a nucleic acid template is monitored to determine the sequence of nucleotides in the template. Each detection event, (e.g., a feature), can be distinguished due to their location in the array.

For these and other applications of polynucleotide arrays, improvements have recently been made to increase the density of features in the arrays. For example, such arrays have at least 50,000 features/cm$^2$, 100,000 features/cm$^2$, 1,000,000 features/cm$^2$, 5,000,000 features/cm$^2$, or higher. Technological advances reduced the typical distance between neighboring features such that the features are only slightly larger than the optical resolution scale, the pixel pitch of the camera, or both. High resolution optics (e.g., objectives with a 0.8 numerical aperture (NA)), combined with fast imaging methods described herein enable increased analysis and throughput in imaging systems.

BRIEF SUMMARY

Disclosed herein, inter alia, are solutions to the aforementioned and other problems in the art. This disclosure provides methods and systems of image analysis useful for rapidly identifying and/or quantifying features on a substrate.

In an aspect, an imaging system is provided. In non-limiting example embodiments, the imaging system includes a plurality of sensor arrays (e.g., two or four independent time delay integration [TDI] sensor arrays), two light sources (e.g., two lasers) that illuminate a sample, a first optical system that directs one excitation beam from each light source onto a sample, a second optical system that directs fluorescent emissions from the sample to each sensor array.

In another aspect, there is disclosed an imaging system including: a sample stage moving at a sample stage speed, wherein the sample stage is configured to receive a sample including a first fluorophore and a second fluorophore; a first sensor array and a second sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, and the interaction of the second excitation beam with the second fluorophore generates a second fluorescent emission; a second optical system configured to direct the first fluorescent emission to the first sensor array, and the second fluorescent emission to the second sensor array, wherein the first fluorescent emission impinges upon and generates a first charge that travels across the first sensor array, wherein the second fluorescent emission impinges upon and generates a second charge that travels across the second sensor array; and wherein the travel of at least one of the first and the second charge is synchronized with the sample stage speed. In embodiments, the imaging system further includes a third fluorophore, and a fourth fluorophore; a third sensor array, and a fourth sensor array, wherein the interaction of the first excitation beam with the third fluorophore generates a third fluorescent emission, and the interaction of the second excitation beam with a fourth fluorophore generates a fourth fluorescent emission; wherein the second optical system is configured to direct the third fluorescent emission to the third sensor array and the fourth fluorescent emission to the fourth sensor array, wherein the third fluorescent emission impinges upon and generates a third charge that travels across the third sensor array, wherein the fourth fluorescent emission impinges upon and generates a fourth charge that travels across the fourth sensor array, wherein the travel of at least one of the third and the fourth charge is synchronized with the sample stage speed.

In another aspect, there is disclosed an imaging system including: a sample stage moving at a sample stage speed, wherein the sample stage includes a sample including a first fluorophore, a second fluorophore, a third fluorophore, and a fourth fluorophore; a first sensor array, second sensor array, third sensor array, and a fourth sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, the interaction of the second excitation beam with the second fluorophore generates a second fluorescent emission, the interaction of the first excitation beam with a third fluorophore generates a third fluorescent emission, and the interaction of the second excitation beam with a fourth fluorophore generates a fourth fluorescent emission; a second optical system configured to direct the first fluorescent emission to the first sensor array, the second fluorescent emission to the second sensor array, the third fluorescent emission to the third sensor array, the fourth fluorescent emission to the fourth sensor array, wherein the first fluorescent emission impinges upon and generates a first charge that travels across the first sensor array, wherein the second fluorescent emission impinges upon and generates a second charge that travels across the second sensor array, wherein the third fluorescent emission impinges upon and generates a third charge that travels across the third sensor array, wherein the fourth fluorescent emission impinges upon and generates a fourth charge that travels across the fourth sensor array, wherein the travel of at least one of the first, the second, the third and the fourth charge is synchronized with the sample stage speed.

In another aspect, there is disclosed a method of imaging a sample including: a) directing a first excitation beam and a second excitation beam onto a sample, wherein the sample is on a sample stage moving at a sample stage speed, wherein the sample comprises a first fluorophore that generates a first fluorescent emission and a second fluorophore that generates a second fluorescent emission following interaction with a first excitation beam and a second excitation beam, respectively; b) directing the first fluorescent emission to impinge upon and generates a charge that travels across a first sensor array at a first charge speed, and directing the second fluorescent emission to impinge upon and generate a second charge that travels across a second sensor array at a second charge speed, wherein at least one of the first charge speed and the second charge speed is synchronized with the sample stage speed; and c) scanning the sample in a scan dimension and repeating step a) and step b) to form an image of the sample. In embodiments, the sample further includes a third fluorophore that generates a third fluorescent emission and a fourth fluorophore that generates a fourth fluorescent emission following interaction with a first excitation beam and a second excitation beam, respectively; and directing said third fluorescent emission to impinge upon and generate a third charge that travels across a third sensor array at a third charge speed, and directing said fourth fluorescent emission to impinge upon and generate a fourth charge that travels across a fourth sensor array at a fourth charge speed.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
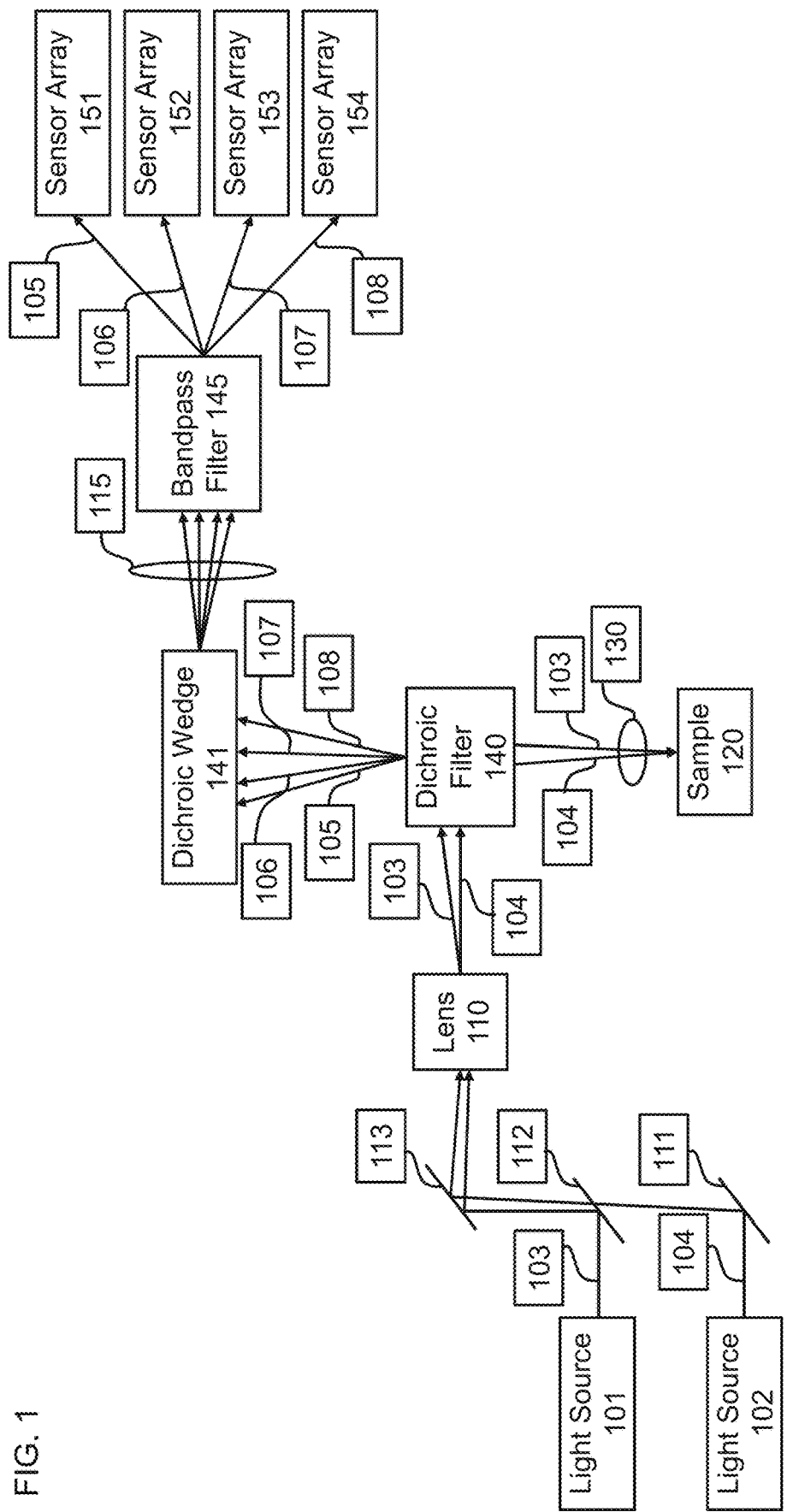
FIG. 1 is an exemplary illustration of a 4-color imaging system using one camera, wherein the camera contains four sensor arrays (i.e., image sensor arrays)

Nucleic acid sequencing, biomolecule imaging, and other uses of biochemical arrays require advanced imaging systems to achieve commercially viable data acquisition rates. The number of biochemical experiments from which data may be collected per unit time can depend on the array density and image acquisition speed, among other factors. Increased array density can complicate the image acquisition problem because it can make keeping track of the identity of each experiment in an image challenging. One of most common methods of sequencing DNA is to fluorescently label each of the four nucleotide bases of a DNA strand. Typically, the resolution of each base pair is about 0.5 nm across, and the light from their fluorescence is extremely weak. High-sensitivity image sensors and imaging systems are needed.

Image acquisition speed can be increased by using multiple excitation beams to image various fluorophores in the sample (e.g., sample that includes nucleic acid for sequencing). However, imaging using multiple excitation beams may require additional optical elements (e.g., optical grating) to separate emission beams (e.g., fluorescent beams) from the various fluorophores. Additionally, or alternately, the excitation beams can be impinged on the sample one at a time (e.g., using time-division multiplexing). Additional optical elements and/or employing time-division multiplexing can increase the complexity of the imaging system and/or slow the speed of data acquisition. Subject matter described herein can improve image acquisition speed by using excitation beams that are spatially separate. This can result in emission beams that can be simultaneously detected without employing additional optics to separate the emission beams and/or detect one emission beam at a time.

In another aspect, there is disclosed a method of imaging a sample. In embodiments, the sample includes a first fluorophore and a second fluorophore (e.g., a first fluorophore type and a second fluorophore type). The sample may contain a plurality of fluorophores of at least four different types, or fluorophore types having different absorption and emission profiles. In embodiments, the sample includes a first fluorophore, a second fluorophore, a third fluorophore, and a fourth fluorophore, wherein each fluorophore has a different fluorescent emission profile. In embodiments, the method includes directing a first excitation beam and second excitation beam onto the sample, wherein the interaction of the first excitation beam with the first fluorophore generates a first fluorescent emission, and the interaction of the second excitation beam with the second fluorophore generates a second fluorescent emission. In embodiments, the method includes directing a first excitation beam and second excitation beam onto a sample, wherein the interaction of the first excitation beam with the first fluorophore generates a first fluorescent emission, the interaction of the second excitation beam with the second fluorophore generates a second fluorescent emission; the interaction of the first excitation beam with a third fluorophore generates a third fluorescent emission; and the interaction of the second excitation beam with a fourth fluorophore generates a fourth fluorescent emission. In embodiments, the method includes directing the first fluorescent emission to the first sensor array, and the second fluorescent emission to the second sensor array, wherein the first fluorescent emission impinges upon and generates a first charge (i.e., absorbs at the photodiode) that travels across the first sensor array, wherein the second fluorescent emission impinges upon and generates a second charge (i.e., absorbs at the photodiode) that travels across the second sensor array, and wherein the travel of at least one of the first and the second charge is synchronized with the sample stage speed. In embodiments, the method includes directing the first fluorescent emission to the first sensor array, the second fluorescent emission to the second sensor array, the third fluorescent emission to the third sensor array, the fourth fluorescent emission to the fourth sensor array, wherein the first fluorescent emission impinges upon and generates a first charge that travels across the first sensor array, wherein the second fluorescent emission impinges upon and generates a second charge that travels across the second sensor array, wherein the third fluorescent emission impinges upon and generates a third charge that travels across the third sensor array, wherein the fourth fluorescent emission impinges upon and generates a fourth charge that travels across the fourth sensor array, and wherein the travel of at least one of the first, the second, the third and the fourth charge is synchronized with the sample stage speed. In embodiments, the speed of all four charges is synchronized with the sample stage speed. In embodiments, the speed of two charges (e.g., the first and the third charge) is synchronized with the sample stage speed. It is understood that when a charge travels across a sensor array (e.g., a first charge that travels across a first sensor array) that the charge is transferred across the array according to currently understood theories in the art. For example, the charge transfer originates from the thermal motion phenomenon of electrons, where the electrons which have enough thermal velocity in the transfer direction will cross the barrier on the charge transfer path (i.e., across the image sensor). Light energy incident on the sensor is transformed into an electric signal for digitization, which is transferred to a computing device.

In another aspect, there is disclosed an imaging system including: a sample stage moving at a sample stage speed, wherein the sample stage is configured to receive a sample including a first fluorophore and a second fluorophore; a first sensor array and a second sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, and the interaction of the second excitation beam with the second fluorophore generates a second fluorescent emission; a second optical system configured to direct the first fluorescent emission to the first sensor array, and the second fluorescent emission to the second sensor array, wherein the first fluorescent emission impinges upon and generates a first charge that travels across the first sensor array, wherein the second fluorescent emission impinges upon and generates a second charge that travels across the second sensor array; and wherein the travel of at least one of the first and the second charge is synchronized with the sample stage speed. In embodiments, the imaging system further includes a third fluorophore, and a fourth fluorophore; a third sensor array, and a fourth sensor array, wherein the interaction of the first excitation beam with the third fluorophore generates a third fluorescent emission, and the interaction of the second excitation beam with a fourth fluorophore generates a fourth fluorescent emission; wherein the second optical system is configured to direct the third fluorescent emission to the third sensor array and the fourth fluorescent emission to the fourth sensor array, wherein the third fluorescent emission impinges upon and generates a third charge that travels across the third sensor array, wherein the fourth fluorescent emission impinges upon and generates a fourth charge that travels across the fourth sensor array, wherein the travel of at least one of the third and the fourth charge is synchronized with the sample stage speed.

In another aspect, there is disclosed an imaging system including: a sample stage moving at a sample stage speed, wherein the sample stage includes a sample including a first fluorophore (e.g., a plurality of a first type of fluorophore), a second fluorophore (e.g., a plurality of a second type of fluorophore), a third fluorophore (e.g., a plurality of a third type of fluorophore), and a fourth fluorophore (e.g., a plurality of a fourth type of fluorophore); a first sensor array, second sensor array, third sensor array, and a fourth sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, the interaction of the second excitation beam with the second fluorophore generates a second fluorescent emission, the interaction of the first excitation beam with a third fluorophore generates a third fluorescent emission, and the interaction of the second excitation beam with a fourth fluorophore generates a fourth fluorescent emission; a second optical system configured to direct the first fluorescent emission to the first sensor array, the second fluorescent emission to the second sensor array, the third fluorescent emission to the third sensor array, the fourth fluorescent emission to the fourth sensor array, wherein the first fluorescent emission impinges upon and generates a first charge that travels across the first sensor array, wherein the second fluorescent emission impinges upon and generates a second charge that travels across the second sensor array, wherein the third fluorescent emission impinges upon and generates a third charge that travels across the third sensor array, wherein the fourth fluorescent emission impinges upon and generates a fourth charge that travels across the fourth sensor array, wherein the travel of at least one of the first, the second, the third and the fourth charge is synchronized with the sample stage speed. In embodiments, each fluorophore type is different. For example, the first fluorophore may be a cyanine dye (e.g., CY3B) and the second fluorophore may be a different cyanine dye (e.g., Alexa® Fluor 647). In embodiments, each fluorophore (e.g., the first fluorophore, a second fluorophore, a third fluorophore, and a fourth fluorophore) is spectrally distinct. In embodiments, each fluorophore includes a maximum emission of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

In embodiments, an aerial image is formed when the fluorescent emission impinges upon the sensor array. An aerial image is an image formed by the emission in the plane of the sensor. In embodiments, the aerial image, and movement thereof, is synchronized with the sample stage. In embodiments, the electric charge generated in the sensor by the fluorescent emission travels across the sensor array, wherein the transfer of charge from one row of the sensor array to the next is synchronized with the stage motion. In embodiments, as an image sweeps over each sensor array (i.e., as the sample is scanned), one or more pixels of the sensor array collect a charge. At certain time intervals, the charge in the pixels in each of the rows of pixels is moved to their adjacent rows, in the same direction and velocity as the sample scan. Accumulation of charge can integrate during the entire time required for the row of charge to move from one end of the sensor array to the other end of the sensor array within the image system.

In embodiments, the first optical system is configured to direct the first excitation beam to a first region of the sample at a first incidence angle, and direct the second excitation beam to a second region of the sample at a second incidence angle. In embodiments, the first and the second excitation beams are spatially separated and impinge on the sample at different locations. As a result, fluorescent emissions generated by the first excitation beam are spatially separated from the fluorescent emissions generated by the second excitation beams. For example, the first and third fluorescent emissions generated by the first excitation beam are spatially separated from the second and the fourth fluorescent emissions generated by the second excitation beams.

In embodiments, the first optical system is configured to direct the first excitation beam to a first region of the sample and direct the second excitation beam to a second region of the sample, wherein the first region and second region are separated by about 10 µm to about 500 µm. In embodiments, the first region and second region are separated by about 10 µm, about 20 µm, about 30 µm, about 40 µm, about 50 µm, about 60 µm, about 70 µm, about 80 µm, about 90 µm, or about 100 µm. In embodiments, the first region and second region are separated by about 1 µm, about 2 µm, about 3 µm, about 4 µm, about 5 µm, about 6 µm, about 7 µm, about 8 µm, about 9 µm, or about 10 µm. In embodiments, the first region and second region are separated by about 30 µm, about 35 µm, about 40 µm, about 45 µm, about 50 µm, about 55 µm, or about 60 µm. In embodiments, the first region and second region are separated by about 50 µm. In embodiments, the first region and second region are separated by about 50 µm, about 51 µm, about 52 µm, about 53 µm, about 54 µm, about 55 µm, about 56 µm, about 57 µm, about 58 µm, about 59 µm, or about 60 µm.

In embodiments the emission, (e.g., a beam of light or a plurality of photons) forms an image in a particular location in space, e.g., in the plane of the image sensor. In embodiments, the emission beam absorbs on the image sensor and an image formed by this emission in the plane of the sensor (i.e., an aerial image, to use a term from lithography) is said to travel across the sensor while the sample (the object that gives rise to the image) is traveling on the sample stage.

In embodiments, the second optical system includes a first optical element including: a first surface configured to reflect the first fluorescent emission towards the first sensor array, and reflect the second fluorescent emission towards the second sensor array; and a second surface configured to reflect the third fluorescent emission towards the third sensor array, and reflect the fourth fluorescent emission towards the fourth sensor array. By reflecting the first and the third fluorescent emission (generated by the first excitation beam) from the first and the second surface, respectively, spatial separation between the first and the third fluorescent emission can be achieved. By reflecting the second and the fourth fluorescent emission (generated by the second excitation beam) from the first and the second surface, respectively, spatial separation between the second and the fourth fluorescent emission can be achieved.

In embodiments, the second optical system includes a second optical element downstream from the first optical element and is configured to focus the first fluorescent emission, the second fluorescent emission, the third fluorescent emission, and the fourth fluorescent emission.

In embodiments, the second optical system includes a band pass filter configured to selectively transmit the first fluorescent emission, the second fluorescent emission, the third fluorescent emission, and the fourth fluorescent emission. A band pass filter selectively passes light in a wavelength range defined by a center wavelength of maximum radiation transmission ($T_{max}$) and a bandwidth and blocks passage of light outside of this range. $T_{max}$ defines the percentage of radiation transmitted at the center wavelength. In embodiments, the band pass filter is configured to transmit excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

In embodiments, the first optical element is a dichroic wedge. In embodiments, the first optical element is a dichroic mirror. In embodiments, the first optical element includes a dichroic wedge. In embodiments, the first optical element is a dichroic filter.

In embodiments, a detection camera includes the first sensor array, the second sensor array, the third sensor array, and the fourth sensor array. In embodiments, the detection camera includes the first sensor array and the second sensor array. In embodiments, the detection camera includes the third sensor array and the fourth sensor array. In embodiments, the imaging system includes one camera. In embodiments, the imaging system includes two cameras. In embodiments, the imaging system includes three cameras. In embodiments, the imaging system includes four cameras. In embodiments, the camera includes 1 image sensor. In embodiments, the camera includes 2 image sensors. In embodiments, the camera includes 3 image sensors. In embodiments, the camera includes 4 image sensors. In embodiments, each camera includes one or more image sensors. In embodiments, the camera includes two image sensors. In embodiments, the imaging system includes two cameras, wherein each camera independently includes two image sensors.

In embodiments, the second optical system includes a first optical element configured to reflect the first fluorescent emission towards the first sensor array, and transmit the third fluorescent emission towards the third sensor array (this provides spatial separation between the first and the third fluorescent emission); and reflect the second fluorescent emission towards the second sensor array, and transmit the fourth fluorescent emission towards the fourth sensor array. By configuring the first optical element to reflect the first fluorescent emission and transmit the third fluorescent emission, spatial separation between the first and the third fluorescent emission is achieved. By configuring the second optical element to reflect the second fluorescent emission and transmit the fourth fluorescent emission, spatial separation between the second and the fourth fluorescent emission is achieved. In embodiments, the imaging system spatially separates the excitation and emission beams.

In embodiments, the second optical system includes: a first lens downstream from the first optical element and configured to focus the first fluorescent emission and the third fluorescent emission; and a second lens downstream from the first optical element and configured to focus the second fluorescent emission and the fourth fluorescent emission.

In embodiments, the second optical system includes: a first band pass filter configured to selectively transmit the first fluorescent emission and the third fluorescent emission; and a second band pass filter configured to selectively transmit the second fluorescent emission and the fourth fluorescent emission.

In embodiments, a first detection camera includes the first sensor array and the third sensor array, and a second detection camera includes the second sensor array and the fourth sensor array.

In embodiments, the first optical element is an optical filter. In embodiments, the first optical element is a dichroic beamsplitter.

In embodiments, each sensor array is a TDI sensor array. A sensor array refers to a device or apparatus having a plurality of elements that convert the energy of contacted photons into an electrical response. The term "time delay integration" or "TDI" refers to sequential detection of different portions of a sample by different subsets of elements of a detector array, wherein transfer of charge between the subsets of elements proceeds at a rate synchronized with and in the same direction as the apparent motion of the sample being imaged. For example, TDI can be carried out by scanning a sample such that a frame transfer device produces a continuous video image of the sample by means of a stack of linear arrays aligned with and synchronized to the apparent movement of the sample, whereby as the image moves from one line to the next, the stored charge moves along with it. Accumulation of charge can integrate during the entire time required for the row of charge to move from one end of the sensor array to the other end of the sensor array.

In embodiments, the sensor array (e.g., TDI sensor array) can be configured for binning. Binning increases the detector array's sensitivity by summing the charges from multiple pixels in the array into one pixel. Exemplary types of binning that can be used include horizontal binning, vertical binning, or full binning. With horizontal binning, pairs of adjacent pixels in each line of a detector array are summed. With vertical binning, pairs of adjacent pixels from two lines in the array are summed. Full binning is a combination of horizontal and vertical binning in which four adjacent pixels are summed. For example, binning may include horizontal (1×2), vertical (2×1), or combined (2×2). In embodiments, the sensor array (e.g., TDI sensor array) is not configured for binning.

In embodiments, a first subset of sensors of the first sensor array are activated when the first cross-section overlaps with the first subset of sensors, and a second subset of sensors of the first sensor array are activated when the first cross-section overlaps with the second subset of sensors. In embodiments, a third subset of sensors of the second sensor array are activated when the second cross-section overlaps with the third subset of sensors, and a fourth subset of sensors of the second sensor array are activated when the second cross-section overlaps with the fourth subset of sensors. In embodiments, a first time difference between the activation of the first subset of sensors and the activation of the second subset of sensors of the first sensor array is based on a first speed of travel of the first cross-section and separation between the first subset of sensors and the second subset of sensors. In embodiments, a second time difference between the activation of the third subset of sensors and the activation of the fourth subset of sensors of the second sensor array is based on a second speed of travel of the second cross-section and separation between the third subset of sensors and the fourth subset of sensors.

In embodiments, the speed of the sample stage moves at a rate of about 1 mm/second to about 50 mm/second. In embodiments, the speed of the sample stage moves at a rate of about 10 mm/second to about 30 mm/second. In embodiments, the speed of the sample stage moves at a rate of about 15 mm/second to about 25 mm/second. In embodiments, the speed of the sample stage moves at a rate of about 20 mm/second. The sample stage is configured to receive or support a sample, for example a sample comprising a flow cell, reaction vessel, or other substrate wherein the flow cell, reaction vessel, or other substrate includes one or more objects to be imaged (e.g., biomolecules). The sample stage is configured to move along any of x/y/z axes, which are oriented and/or aligned relative to the sample stage. In embodiments, the sample stage includes a precision mounting plate. A precision mounting plate may be fabricated with alignment surfaces, such as mounting pins, grooves, slots, grommets, tabs, magnets, datum surfaces, tooling balls, or other surfaces designed to accept subassemblies or modules of interest.

In embodiments, each sensor array is at least 2,000 pixels wide. In embodiments, each sensor array is at least 4,000 pixels wide. In embodiments, each sensor array is at least 8,000 pixels wide. In embodiments, each sensor array is at least 12,000 pixels wide. In embodiments, each sensor array is at least 16,000 pixels wide. In embodiments, each sensor array is at least 16 pixels long. In embodiments, each sensor array is at least 32 pixels long. In embodiments, each sensor array is at least 64 pixels long. In embodiments, each sensor array is at least 128 pixels long. In embodiments, each sensor array is at least 256 pixels long. In embodiments, each sensor array is at least 8,000 pixels wide and at least 64 pixels long. In embodiments, each sensor array is at least 8,000 pixels wide and at least 128 pixels long. In embodiments, each sensor array is at least 8,000 pixels wide and at least 256 pixels long. In embodiments, each sensory array is rectangular (i.e., two sides of the equiangular quadrilateral is longer than the other two sides). In embodiments, each sensory array is square (i.e., all four sides of the equiangular quadrilateral are equal).

In embodiments, each sensor array is about 1,000 pixels wide to about 20,000 pixels wide. In embodiments, each sensor array is about 3,000 pixels wide to about 10,000 pixels wide. In embodiments, each sensor array is about 5,000 pixels wide to about 9,000 pixels wide. In embodiments, each sensor array is about 1,000 pixels wide. In embodiments, each sensor array is about 2,000 pixels wide. In embodiments, each sensor array is about 3,000 pixels wide. In embodiments, each sensor array is about 4,000 pixels wide. In embodiments, each sensor array is about 5,000 pixels wide. In embodiments, each sensor array is about 6,000 pixels wide. In embodiments, each sensor array is about 7,000 pixels wide. In embodiments, each sensor array is about 8,000 pixels wide. In embodiments, each sensor array is about 9,000 pixels wide. In embodiments, each sensor array is about 10,000 pixels wide. In embodiments, each sensor array is about 11,000 pixels wide. In embodiments, each sensor array is about 12,000 pixels wide. In embodiments, each sensor array is about 13,000 pixels wide. In embodiments, each sensor array is about 2,000 pixels wide. In embodiments, each sensor array is about 4,000 pixels wide. In embodiments, each sensor array is about 8,000 pixels wide. In embodiments, each sensor array is about 12,000 pixels wide. In embodiments, each sensor array is about 16,000 pixels wide. In embodiments, each sensor array is about 16 pixels long. In embodiments, each sensor array is about 32 pixels long. In embodiments, each sensor array is about 64 pixels long. In embodiments, each sensor array is about 128 pixels long. In embodiments, each sensor array is about 256 pixels long. In embodiments, each sensor array is about 8,000 pixels wide and about 64 pixels long. In embodiments, each sensor array is about 8,000 pixels wide and about 128 pixels long. In embodiments, each sensor array is about 8,000 pixels wide and about 256 pixels long. In embodiments, each sensor array is about 32 pixels long. In embodiments, each sensor array is about 64 pixels long. In embodiments, each sensor array is about 256 pixels long. In embodiments, each sensor array is about 512 pixels long. In embodiments, each sensor array is about 10 to 300 pixels long. In embodiments, each sensor array is about 32 to about 256 pixels long. In embodiments, each sensor array is about 32 to about 64 pixels long.

In embodiments, the sample stage is a motorized translation stage. In embodiments, the motor is a stepper motor, piezo motor, brushless motor, hysteresis motor, linear motor, or a servomotor. In embodiments, the motor is a stepper motor. In embodiments, the stepper motor includes an integrated ball spline. In embodiments, the motor is a piezo motor. In embodiments, the motor is a brushless motor. In embodiments, the motor is a hysteresis motor. In embodiments, the motor is a linear motor. In embodiments, the motor is a servomotor. In embodiments, the servomotor includes a braking mechanism. In embodiments, the motor is a Picomotor™ actuator.

In embodiments, the sample stage is configured to receive and retain a sample. In embodiments, the sample stage is configured to receive and retain a reaction vessel containing a sample (e.g., a flow cell as described herein). In embodiments, the sample stage includes a position encoder, wherein the position encoder generates a synchronization signal that synchronizes the travel of the fluorescent emissions. In embodiments, the imaging system further includes an absolute encoder. An absolute encoder provides information about the position (i.e., the distance) the camera, the image sensor, and/or the lens, relative to the sample stage and/or the sample. The absolute position encoder not only provides highly repeatable positioning, but also enables the recovery of a previously-saved position if rescanning a previously imaged region.

In embodiments, the sample stage includes, and optionally retains, a reaction vessel, flow cell, substrate, or multiwell container. Those skilled in the art will recognize that a flow cell or other support structure may be used with any of a variety of arrays known in the art to achieve similar results. Such arrays may be formed by arranging biological components of samples randomly or in predefined patterns on the surfaces of the support by any known technique. The term "multiwell container" as used herein, refers to a substrate comprising a surface, the surface including a plurality of reaction chambers separated from each other by interstitial regions on the surface. In embodiments, the microplate has dimensions as provided and described by American National Standards Institute (ANSI) and Society for Laboratory Automation And Screening (SLAS); for example the tolerances and dimensions set forth in ANSI SLAS 1-2004 (R2012); ANSI SLAS 2-2004 (R2012); ANSI SLAS 3-2004 (R2012); ANSI SLAS 4-2004 (R2012); and ANSI SLAS 6-2012, which are incorporated herein by reference. The dimensions of the microplate as described herein and the arrangement of the reaction chambers may be compatible with an established format for automated laboratory equipment.

The reaction chambers may be provided as wells (alternatively referred to as reaction chambers), for example a multiwell container may contain 2, 4, 6, 12, 24, 48, 96, 384, or 1536 sample wells. In embodiments, the 96 and 384 wells are arranged in a 2:3 rectangular matrix. In embodiments, the 24 wells are arranged in a 3:8 rectangular matrix. In embodiments, the 48 wells are arranged in a 3:4 rectangular matrix. In embodiments, the reaction chamber is a microscope slide (e.g., a glass slide about 75 mm by about 25 mm). In embodiments the slide is a concavity slide (e.g., the slide includes a depression). In embodiments, the slide includes a coating for enhanced biomolecule adhesion (e.g., poly-L-lysine, silanes, carbon nanotubes, polymers, epoxy resins, or gold). In embodiments, the multiwell container is about 5 inches by about 3.33 inches, and includes a plurality of 5 mm diameter wells. In embodiments, the multiwell container is about 5 inches by about 3.33 inches, and includes a plurality of 6 mm diameter wells. In embodiments, the multiwell container is about 5 inches by about 3.33 inches, and includes a plurality of 7 mm diameter wells. In embodiments, the multiwell container is about 5 inches by about 3.33 inches, and includes a plurality of 7.5 mm diameter wells. In embodiments, the multiwell container is 5 inches by 3.33 inches, and includes a plurality of 7.5 mm diameter wells. In embodiments, the multiwell container is about 5 inches by about 3.33 inches, and includes a plurality of 8 mm diameter wells. In embodiments, the multiwell container is a flat glass or plastic tray in which an array of wells are formed, wherein each well can hold between from a few microliters to hundreds of microliters of fluid reagents and samples.

The term "well" refers to a discrete concave feature in a substrate having a surface opening that is completely surrounded by interstitial region(s) of the surface. Wells can have any of a variety of shapes at their opening in a surface including but not limited to round, elliptical, square, polygonal, or star shaped (i.e., star shaped with any number of vertices). The cross section of a well taken orthogonally with the surface may be curved, square, polygonal, hyperbolic, conical, or angular. The wells of a multiwell container are available in different shapes, for example F-Bottom: flat bottom; C-Bottom: bottom with minimal rounded edges; V-Bottom: V-shaped bottom; or U-Bottom: U-shaped bottom. In embodiments, the well is substantially square. In embodiments, the well is square. In embodiments, the well is F-bottom. In embodiments, the multiwell container includes 24 substantially round flat bottom wells. In embodiments, the multiwell container includes 48 substantially round flat bottom wells. In embodiments, the multiwell container includes 96 substantially round flat bottom wells. In embodiments, the multiwell container includes 384 substantially square flat bottom wells.

The discrete regions (i.e., features, wells) of the multiwell container may have defined locations in a regular array, which may correspond to a rectilinear pattern, circular pattern, hexagonal pattern, or the like. In embodiments, the pattern of wells includes concentric circles of regions, spiral patterns, rectilinear patterns, hexagonal patterns, and the like. In embodiments, the pattern of wells is arranged in a rectilinear or hexagonal pattern A regular array of such regions is advantageous for detection and data analysis of signals collected from the arrays during an analysis. These discrete regions are separated by interstitial regions. As used herein, the term "interstitial region" refers to an area in a substrate or on a surface that separates other areas of the substrate or surface. For example, an interstitial region can separate one concave feature of an array from another concave feature of the array. The two regions that are separated from each other can be discrete, lacking contact with each other. In another example, an interstitial region can separate a first portion of a feature from a second portion of a feature. In embodiments the interstitial region is continuous whereas the features are discrete, for example, as is the case for an array of wells in an otherwise continuous surface. The separation provided by an interstitial region can be partial or full separation. In embodiments, interstitial regions have a surface material that differs from the surface material of the wells (e.g., the interstitial region contains a photoresist and the surface of the well is glass). In embodiments, interstitial regions have a surface material that is the same as the surface material of the wells (e.g., both the surface of the interstitial region and the surface of well contain a polymer or copolymer).

In embodiments, the imaging system further includes one or more of the following: a collimating lens, a beam shaping lens, mirrors, or a cylindrical lens.

In embodiments, the imaging system further includes one or more line generators. In embodiments, the imaging system further includes two line generators. In embodiments, one or more line generators (e.g., 2, 4, 6, 8, or 10 lines) are used to illuminate the sample. The one or more line generators may be configured to produce an excitation line having a shape at the sample that is rectangular or oblong. Exemplary shapes include, but are not limited to, a rectangular, elliptical, or oval shape. In embodiments, one or more excitation lines contacts the sample to illuminate and/or excite one or more biomolecules in the sample. In embodiments, the line is rectangular having a height and width. In embodiments, the height of each line is approximately 1, 2, 3, 4, or 5 mm. In embodiments, the height of each line is approximately 1.1 mm, 1.2 mm, 1.3 mm, 1.4 mm, 1.5 mm, 1.6 mm, 1.7 mm, 1.8 mm, 1.9 mm, or 2.0 mm. In embodiments, the width of each line is about 5 µm, 10 µm, 15 µm, 20 µm, 25 µm, or about 30 µm. In embodiments, the width of each line is 1.5 mm to about 2.0 mm and the height of each line is about 10 µm to about 30 µm. In embodiments, the width of each line is 1.6 mm to about 1.7 mm and the height of each line is about 15 µm to about 25 µm. In embodiments, the width of each line is 1.7 mm and the height of each line is about 20 µm.

In embodiments, the imaging system is within a microfluidic device. In an aspect is provided a microfluidic device, wherein the microfluidic device includes an imaging system as described herein. In embodiments, the microfluidic device includes one or more reaction vessels or solid support where reagents interact and are imaged. Exemplary systems having fluidic components that can be readily modified for use in a system herein include, but are not limited to, those set forth in U.S. Pat. Nos. 8,241,573, 8,039,817; or US Pat. App. Pub. No. 2012/0270305 A1, each of which is incorporated herein by reference. In embodiments, the microfluidic device further includes one or more excitation lasers. In embodiments, the imaging system is within a bioanalytical instrument. In embodiments, the bioanalytical instrument further includes a light source and an integrated fluidic system of one or more interconnected chambers, ports, and channels in fluid communication and configured for carrying out an analytical reaction or processes. In embodiments, the device as described herein detects scattered light from the sample. In embodiments, the device as described herein detects diffracted light from the sample. In embodiments, the device as described herein detects reflected light from the sample. In embodiments, the device as described herein detects absorbed light from the sample. In embodiments, the device as described herein detects refracted light from the sample. In embodiments, the device as described herein detects transmitted light not absorbed by the sample. In embodiments, the device further includes at least one reservoir physically coupled to the structure. In embodiments, the reservoir is configured to store one or more reagents or hold waste material. In some embodiments, the reagents include fluids such as water, buffer solution (e.g., an imaging buffer including ascorbic acid), target capture reagents, or nucleic acid amplification reagents. In some embodiments, the reagent container compartments may be configured to maintain the contents of such containers at prescribed storage temperatures and/or to agitate such containers to maintain the contents of the containers in solution or suspension. In embodiments, the at least one reservoir includes reaction reagents, for example nucleic acid amplification reagents (e.g., polymerase and nucleotides needed for amplification), and/or nucleic acid sequencing reagents. In embodiments, the at least one reservoir includes at least one of a waste reservoir, a sequencing reagent reservoir, a clustering reagent reservoir, and a wash solution reservoir. In embodiments, the device includes a plurality of a sequencing reagent reservoirs and clustering reagent reservoirs. In embodiments, the clustering reagent reservoir includes amplification reagents (e.g., an aqueous buffer containing enzymes, salts, and nucleotides, denaturants, crowding agents, etc.).

In embodiments, the imaging system may generate image data, for example, at a resolution between 0.1 and 50 microns, which is then forwarded to a control/processing system within the bioanalytical instrument. The control/processing system may perform various operations, such as analog-to-digital conversion, scaling, filtering, and association of the data in multiple frames to appropriately and accurately image multiple sites at specific locations on a sample. The control/processing system may store the image data and may ultimately forward the image data to a post-processing system where the data is further analyzed. For example, further analysis may include determining nucleotide sequence information from the image data. In embodiments, the control/processing system may include hardware, firmware, and software designed to control operation of the bioanalytical instrument. The image data may be analyzed by the bioanalytical instrument itself, or may be stored for analysis by other systems and at different times subsequent to imaging. In embodiments, the cameras include an objective lens having high numerical aperture (NA) values. Image data obtained by the optical assembly may have a resolution that is between 0.1 and 50 microns or, more particularly, between 0.1 and 10 microns. In embodiments, the numerical aperture for the camera is at least 0.2. In embodiments, the numerical aperture for the camera is no greater than 0.8. In embodiments, the numerical aperture for the camera is no greater than 0.5. Image systems described herein may have a resolution that is sufficient to individually resolve the features or sites that are separated by a distance of less than 10 µm, 5 µm, 2 µm, 1.5 µm, 1.0 µm, 0.8 µm, 0.5 µm, or less. In embodiments, the image systems described herein may have a resolution that is sufficient to individually resolve the features or sites that are separated by a distance of 100 µm at most. Depending on the sample, for example the microwells or nanowells of a multiwell container, the imaging system described herein may be configured for wide-field detection. The field diameter for the imaging system may be, for example, at least 0.5 mm, 1 mm, 2 mm, 3 mm, 4 mm, 5 mm or larger. By choosing suitable optical components, the field diameter can be limited to a maximum area as well and, as such the field diameter can be, for example, no larger than 5 mm, 4 mm, 3 mm, 2 mm or 1 mm. For example, in embodiments an image obtained by an imaging system can have an area that is in a range of about 0.25 $mm^2$ to about 25 $mm^2$.

In another aspect, there is disclosed a method of imaging a sample including: a) directing a first excitation beam and a second excitation beam onto a sample, wherein the sample is on a sample stage moving at a sample stage speed, wherein the sample comprises a first fluorophore that generates a first fluorescent emission and a second fluorophore that generates a second fluorescent emission following interaction with a first excitation beam and a second excitation beam, respectively; b) directing the first fluorescent emission to impinge upon and generate a first charge that travels across a first sensor array at a first charge speed, and directing the second fluorescent emission to impinge upon and generate a second charge that travels across a second sensor array at a second charge speed, wherein at least one of the first emission speed and the second emission speed is synchronized with the sample stage speed; and c) scanning the sample in a scan dimension and repeating step a) and step b) to form an image of the sample. In embodiments, the sample further includes a third fluorophore that generates a third fluorescent emission and a fourth fluorophore that generates a fourth fluorescent emission following interaction with a first excitation beam and a second excitation beam, respectively; and directing said third fluorescent emission to impinge upon and generate a third charge that travels across a third sensor array at a third charge speed, and directing said fourth fluorescent emission to impinge upon and generates a fourth charge that travels across a fourth sensor array at a fourth charge speed. In embodiments the collective sum of charge within each pixel travels across the sensor array.

The sample stage is configured to move along any of x/y/z axes, which are oriented and/or aligned relative to the sample stage. To establish a standard coordinate system and frame of reference, it is useful to provide a description of the axes. In conventional descriptions of three-dimensional space using Cartesian coordinates, there are six degrees of freedom. Each degree of freedom corresponds to the translation along and rotations around three perpendicular X-, Y-, and Z-axes. A first degree of freedom can be defined as moving left and right along the X-axis. A second degree of freedom can be defined as moving backward and forward along the Y-axis. A third degree of freedom can be defined as moving up and down along the Z-axis. A fourth degree of freedom can be defined as rotating around the X-axis, or "roll" axis, alternatively referred to as the longitudinal axis. A fifth degree of freedom can be defined as rotating around the Y-axis, or "pitch" axis, alternatively referred to as the transverse axis. Used interchangeably throughout, pitch and roll may be referred to as tip and tilt. A sixth degree of freedom can be defined as rotating around the Z-axis, or "yaw." A plane refers to a 2-dimensional (2D) area defined by two axes (e.g., x and y together form the xy plane). When used in reference to a detecting apparatus (e.g., an image sensor) and an object observed by the detector (e.g., the sample), the xy plane may be specified as being orthogonal to the direction of observation between the detector and object being detected. The image plane is a projection of the image on a two-dimensional plane. For example, in embodiments, the image plane is the projection of an image on the surface of the image sensor. In embodiments, the scan axis is the x axis. In embodiments, the scan axis is the y axis.

In embodiments, the travel of the first emission and the travel of the second emission speed is synchronized with the sample stage speed. Synchronizing the sample stage with the charge travel across the array allows for high precision, and more accurate imaging (e.g., relative to a control, such as not synchronizing the sample stage). Given the plethora of different biomolecules and components within a sample that modulate viscosity and thermal sensitivity, controlling the flow rate of the sample is not preferred due to the challenges associated with accurately controlling the rate and maintaining synchrony.

In embodiments, the method includes illuminating a sample and detecting light from the sample (e.g., fluorescent excitation events, scattered light, transmitted light, or reflected light) using the imaging system described herein. In embodiments, the method includes scanning the sample (i.e., translating the sample relative to the camera). In embodiments, the method includes illuminating a sample to generate fluorescent events, and detecting one or more fluorescent events using the imaging system described herein. In embodiments, the method includes detecting clusters (e.g., amplified colonies of nucleic acids) on a solid support. In embodiments, the method includes detecting fluorescently labeled nucleotides incorporated into a template nucleic acid. In embodiments, the method includes sequencing one or more nucleic acid templates. In embodiments, the method includes amplifying one or more nucleic acid templates on a solid support, thereby generating a cluster or colony of a plurality of nucleic acid templates at a feature. In embodiments, the method includes incorporating a labeled nucleotide into a primer hybridized to one or more of the nucleic acid templates and detecting the incorporated nucleotide. In embodiments, detecting includes imaging the feature using the imaging system described herein. In embodiments, the sample includes one or more biomolecules. A variety of biomolecules may be present in the sample. Exemplary biomolecules include, without limitation, nucleic acids such as DNA or RNA, proteins such as enzymes or receptors, polypeptides, nucleotides, amino acids, saccharides, cofactors, metabolites or derivatives of these natural components. Although the systems and methods as described herein are with respect to biomolecules, it will be understood that other samples or components can be used as well. For example, synthetic samples can be used such as combinatorial libraries, or libraries of compounds having species known or suspected of having a desired structure or function. In embodiments, the sample includes one or more fluorescent labels. In embodiments, the sample includes one or more fluorescently labeled biomolecules.

In embodiments, the method includes imaging the sample including four different fluorophores simultaneously. That is, collecting fluorescent emission information for four different fluorophores at the same time.

In embodiments, the first excitation beam and the second excitation beam include an excitation line (e.g., an excitation beam provided by a line generator). In embodiments, one or more line generators (e.g., 2, 4, 6, 8, or 10 lines) are used to illuminate the sample. The one or more line generators may be configured to produce an excitation line having a shape at the sample that is rectangular or oblong. Exemplary shapes include, but are not limited to, a rectangular, elliptical, or oval shape. In embodiments, one or more excitation lines contacts the sample to illuminate and/or excite one or more biomolecules in the sample.

In embodiments, scanning the sample includes moving the sample stage. In embodiments, scanning the sample includes moving the sample stage at a constant speed. Movement of the sample stage can be in one or more dimensions including, for example, one or both of the dimensions that are orthogonal to the direction of propagation for the fluorescent emission and typically denoted as the x and y dimensions. The system may further include a scanning element, which may be a mechanical, electromechanical component, software component, or combination thereof configured to scan the sample along a direction, which may correspond to a scan direction. In an embodiment, the scan direction is orthogonal to the excitation direction of the sample. In an embodiment, the scan direction is non-orthogonal to the excitation beam direction, wherein the orthogonal projected component directly contributes to the final image reconstruction. The term "scanning element" is intended to mean an element capable of sequentially detecting different portions of a sample. A scanning element can operate, by changing the position of one or more component of the system including, for example, the light source the objective lens, the image sensor, or the sample. Exemplary scanning elements include, but are not limited to a galvanometer configured to move a beam (e.g., excitation beam) across a sample or a translation stage configured to move the sample across the beam. In embodiments, the sample is scanned at about 1 $mm^2$/sec, 1.5 $mm^2$/sec, 5 $mm^2$/sec, 10 $mm^2$/sec, 50 $mm^2$/sec or 100 $mm^2$/sec. In embodiments, the sample is scanned at 10 $mm^2$/sec, 20 $mm^2$/sec, 30 $mm^2$/sec, 40 $mm^2$/sec, or 50 $mm^2$/sec. In embodiments, the sample is scanned at about 1, about 2, about 3, about 4, about 5, about 6, about 7, about 8, about 9, or about 10 $mm^2$/sec. In embodiments, the sample is scanned at about 11, about 12, about 13, about 14, about 15, about 16, about 17, about 18, about 19, or about 20 $mm^2$/sec. In embodiments, the sample is scanned at least 20 $mm^2$/sec. In embodiments, the camera is adjusted dynamically as the sample is scanned (e.g., continuously scanned in a scan axis, such as the x axis). In embodiments, the camera is adjusted initially (e.g., during a configuration or first cycle of a series of cyclic experiments) as the sample is scanned (e.g., continuously scanned in a scan axis, such as the x axis). For example, if scanning the sample stage over a series of imaging cycles (e.g., sequencing cycles), an initial configuration scan of the sample adjusts the camera to maximize the focus of the sample and the orientation and/or position of the camera remains static for remaining imaging cycles.

In embodiments, the method further includes storing a data representation of the image of the sample in a computer readable memory.

In embodiments, the excitation beam includes UV radiation, VIS radiation, or IR radiation. In embodiments, the excitation beam includes excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

In embodiments, the illuminator or light source is a radiation source (e.g., an origin or generator of propagated electromagnetic energy) providing incident light to the sample. A radiation source can include an illumination source producing electromagnetic radiation in the ultra violet (UV) range (about 200 to 390 nm), visible (VIS) range (about 390 to 770 nm), or infrared (IR) range (about 0.77 to 25 microns), or other range of the electromagnetic spectrum. In embodiments, the illuminator or light source is a lamp such as an arc lamp or quartz halogen lamp. In embodiments, the illuminator or light source is a coherent light source. In embodiments, the light source is a laser, LED (light emitting diode), a mercury or tungsten lamp, or a super-continuous diode. In embodiments, the light source provides excitation beams having a wavelength between 200 nm to 1500 nm. In embodiments, the laser provides excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm. In embodiments, the laser provides excitation beams having a wavelength of 405 nm, 488 nm, 532 nm, or 633 nm.

In embodiments, the light source provides one or more excitation beams. An excitation beam is intended to mean electromagnetic energy propagated toward a sample or sample region. An excitation beam may be shaped such that the collection of electromagnetic waves or particles are propagated in a uniform direction, wherein the 2-dimensional cross section orthogonal to the direction of propagation is rectangular or oblong. Exemplary 2-dimensional cross sections of an excitation beam can include a rectangular, elliptical, or oval shape. The cross-sectional width of an excitation beam can have one or both dimensions in a range of, for example, about 0.5 µm to about 50 µm. For example, a dimension of the excitation beam can be at least about 0.05 µm, 0.1 µm, 0.5 µm, 1 µm, 5 µm or 10 µm. Furthermore, a dimension of a excitation beam can be, for example, at most about 0.1 µm, 0.2 µm, 0.5 µm, 1 µm, 5 µm or 10 µm. In embodiments, a dimension of a excitation beam is about 0.2 µm to about 50 µm. In embodiments, a dimension of a excitation beam is 10 µm to about 30 µm. In embodiments, a dimension of a excitation beam is 20 µm to about 30 µm. In embodiments, a dimension of a excitation beam is 20 µm. It will be understood that these dimensions are merely exemplary and excitation beams having other dimensions can be used if desired.

In embodiments, the light source is a laser (e.g., a laser such as a solid-state laser or a gas laser). In embodiments, the light source includes one or more vertical cavity surface emitting lasers (VCSELs), vertical external cavity surface emitting lasers (VECSELs), or diode pumped solid state (DPSS) lasers. In embodiments, the light source is a continuous wave (CW) laser or a pulsed laser. In embodiments, the light source is a pulsed laser. In embodiments, the light source is an ultrashort pulsed laser. An ultrashort laser is a laser capable of producing excitation beams for a time duration of a picosecond or less. An ultrashort laser typically includes additional components, such as a pulse controller, pulse shaper, and spatial light modulator, and the like for controlling the pulse of excitation beams. In embodiments, the ultrashort laser provides excitation beams for femtoseconds or picoseconds. In embodiments, the light source is a pulsed femtosecond or picosecond laser. In embodiments, the laser is a Ti-sapphire laser, a dye-laser, or a fiber laser. In embodiments, the system includes two or more light sources (e.g., lasers). In embodiments, the first light source configured to emit light in red wavelengths, and a second light source configured to emit light in green wavelengths. In embodiments, the system includes two or more lasers.

In embodiments, the sample includes modified nucleotides (e.g., nucleotides including a reversible terminator and/or a label). In embodiments, the sample includes nucleotides attached to a substrate. In embodiments, the sample includes surface-immobilized polynucleotides (e.g., polynucleotide primers or polynucleotide templates that are covalently attached to the substrate). In embodiments, the 5' end of the polynucleotides contains a functional group that is tethered to the solid support. Non-limiting examples of covalent attachment include amine-modified polynucleotides reacting with epoxy or isothiocyanate groups on the solid support, succinylated polynucleotides reacting with aminophenyl or aminopropyl functional groups on the solid support, dibenzocyclooctyne-modified polynucleotides reacting with azide functional groups on the solid support (or vice versa), trans-cyclooctyne-modified polynucleotides reacting with tetrazine or methyl tetrazine groups on the solid support (or vice versa), disulfide modified polynucleotides reacting with mercapto-functional groups on the solid support, amine-functionalized polynucleotides reacting with carboxylic acid groups on the core via 1-ethyl-3-(3-dimethylaminopropyl)-carbodiimide hydrochloride (EDC) chemistry, thiol-modified polynucleotides attaching to a solid support via a disulphide bond or maleimide linkage, alkyne-modified polynucleotides attaching to a solid support via copper-catalyzed click reactions to azide functional groups on the solid support, and acrydite-modified polynucleotides polymerizing with free acrylic acid monomers on the solid support to form polyacrylamide or reacting with thiol groups on the solid support.

In embodiments, the substrate is glass or quartz, such as a microscope slide, having a surface that is uniformly silanized. This may be accomplished using conventional protocols e.g., Beattie et al (1995), Molecular Biotechnology, 4: 213. Such a surface is readily treated to permit end-attachment of oligonucleotides (e.g., forward and reverse primers, and/or a splint primer) prior to amplification. In embodiments the solid support surface further includes a polymer coating, which contains functional groups capable of immobilizing polynucleotides. In some embodiments, the solid support includes a patterned surface suitable for immobilization of polynucleotides in an ordered pattern. A patterned surface refers to an arrangement of different regions in or on an exposed layer of a solid support. For example, one or more of the regions can be features where one or more primers are present. The features can be separated by interstitial regions where capture primers are not present. In some embodiments, the pattern can be an x-y format of features that are in rows and columns. In some embodiments, the pattern can be a repeating arrangement of features and/or interstitial regions. In some embodiments, the pattern can be a random arrangement of features and/or interstitial regions. In some embodiments, the primers are randomly distributed upon the solid support. In some embodiments, the primers are distributed on a patterned surface.

In embodiments, the sample includes an array having a plurality of individual sites (e.g., a microarray or multiwell container). A typical microarray contains sites, sometimes referred to as features, each having a population of targets. Sites or features of an array are typically discrete, being separated with spaces between each other. The size of the features and the spacing between the features can vary such that arrays can be high density, medium density or lower density. High density arrays are characterized as having sites separated by less than about 15 μm. Medium density arrays have sites separated by about 15 to 30 μm, while low density arrays have sites separated by greater than 30 μm. In embodiments, the sample is an array including features that are separated by less than 100 μm, 50 μm, 10 μm, 5 μm, 1 μm or 0.5 μm. Other exemplary samples include, but are not limited to, biological specimens (e.g., a nucleic acid, a protein, a cell, a virus, or a tissue), nanoparticles, or electronic chips (e.g., a microprocessor chip). A sample refers to an object or location that is intended to be detected. In embodiments, a sample includes a plurality of distinct features that are targets for imaging. In some embodiments a sample includes a non-planar structure with a surface, such as a bead or a well, to which target nucleic acids have been attached as the target features. In embodiments, the sample is held by a sample holder. The sample holder can be a multiwell plate. In some instances, the multiwell plate has 16, 24, 48, 96, 384 or more sample wells. In some of these instances, an array of light sources, e.g., LEDs, has 16, 24, 48, 96, 384 or more corresponding light sources. In some instances, the multiwell plate is a standard microwell plate for biological analysis. In embodiments, the sample holder is coated, at least internally, with a material for preventing a biological materials from sticking to the sample holder, such as a fluorinated polymer or BSA. In embodiments, the sample includes genomic material which may be sequenced. In embodiments, the sample includes labeled nucleotides, for example nucleotides containing different labels corresponding to different wavelengths of light. The labels may be, for example, fluorescent, chemiluminescent or bioluminescent labels. For example, in gene sequencing (or DNA sequencing), embodiments may be used to determine the precise order of nucleotide bases within a nucleic acid polynucleotide (e.g., a strand of DNA). The nucleotide bases may be labeled with a specific fluorescent label (e.g., adenine (A), guanine (G), cytosine (C), or thymine (T)). Alternatively, one color, two color, or three color sequencing methods, for example, may be used. With respect to fluorescence, each of the nucleotide bases may be determined in order by successively exciting the nucleic acid with excitation light. The nucleic acid may absorb the excitation light and transmit an emitted light of a different wavelength onto an image sensor as described herein. The image sensor may measure the wavelength of emitted light and intensity received by the photodiode. Each nucleotide (e.g., fluorescently labeled nucleotide), when excited by excitation light of a certain wavelength and/or intensity, may emit a certain wavelength of light and/or intensity into the image sensor, allowing identification of the presence of a particular nucleotide base at a particular position in the nucleic acid. Once that particular nucleotide base has been determined, it may be removed from the nucleic acid, such that the next successive nucleotide base may be determined according to a similar process.

In embodiments, the sample includes a microplate array, including: a substrate including a surface, the surface comprising a plurality of wells separated from each other by interstitial regions on the surface, wherein one or more wells includes a sample (e.g., a cell or tissue sample), particle, or nucleic acid. In embodiments, the sample includes a cell. In embodiments, the sample includes a particle. In embodiments, the sample includes a nucleic acid. In embodiments, the sample is a tissue sample. In embodiments, the sample includes a cell. In embodiments, the surface is substantially free of oligonucleotides. In embodiments, the microplate array includes 2, 4, 6, 12, 24, 48, 96, 384 or 1536 wells. In embodiments, the microplate array includes 24, 48, 96, or 384 wells. In embodiments, the microplate array includes 24 wells. In embodiments, the microplate array includes 48 wells. In embodiments, the microplate array includes 96 wells. In embodiments, the microplate array includes 384 wells. In embodiments, the dimensions of the microplate conform to the standards provided by the American National Standards Institute (ANSI) and Society For Laboratory Automation And Screening (SLAS); for example the tolerances and dimensions set forth in ANSI SLAS 1-2004 (R2012); ANSI SLAS 2-2004 (R2012); ANSI SLAS 3-2004 (R2012); ANSI SLAS 4-2004 (R2012); and ANSI SLAS 6-2012. In embodiments, the microplate has a rectangular shape that measures 127.7 mm±0.5 mm in length by 85.4 mm±0.5 mm in width, and includes 6, 12, 24, 48, or 96 wells. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 5-7 mm. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 6 mm.

Figure 2:
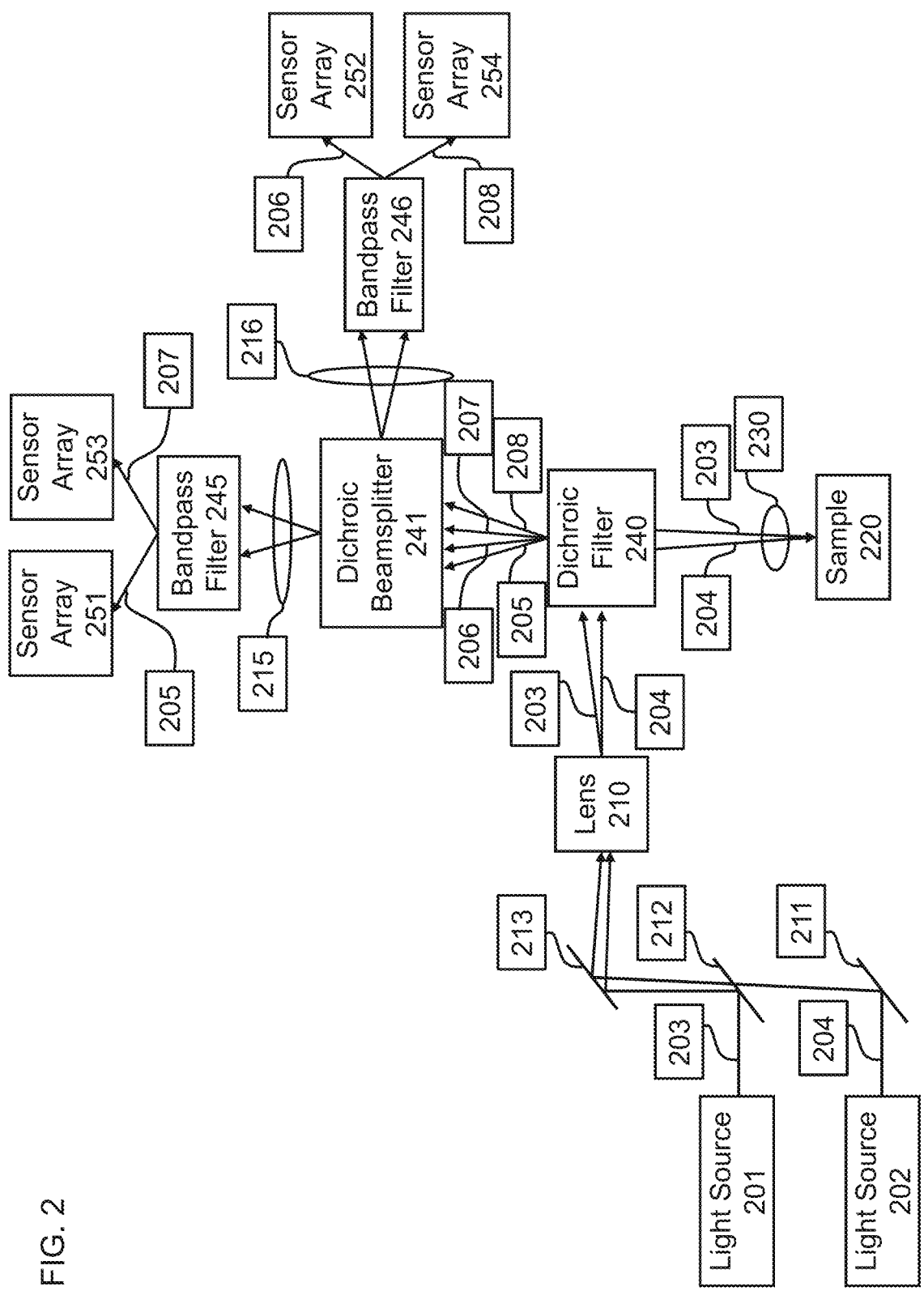
FIG. 2 is an exemplary illustration of a 4-color imaging system using two cameras, wherein each camera contains two sensor arrays (i.e., image sensor arrays).

A general overview of an example workflow is provided in FIGS. 1-2. Described herein is an imaging system that includes at least one CCD-CMOS sensor array (alternatively referred to herein as a TDI array or hybrid TDI line scan sensor). A hybrid TDI sensor (e.g., a CCD-CMOS sensor array) combines the CCD pixel structure with CMOS technology enabling ultra-high-speed image captures with greater sensitivity, relative to conventional CCD and/or conventional CMOS sensors. In embodiments, the CCD-CMOS sensor array captures a plurality (e.g., tens of hundreds of lines), wherein each line successively captures a snapshot of the sample as it passes, allowing the accumulation of multiple images that can result in a very low noise image of a dark or hard-to-image object.

In embodiments, the sample is an array (e.g., a microarray). A typical microarray contains sites, sometimes referred to as features, each having a population of targets. Sites or features of an array are typically discrete, being separated with spaces between each other. The size of the features and the spacing between the features can vary such that arrays can be high density, medium density or lower density. High density arrays are characterized as having sites separated by less than about 15 μm. Medium density arrays have sites separated by about 15 to 30 μm, while low density arrays have sites separated by greater than 30 μm. In embodiments, the sample is an array including features that are separated by less than 100 μm, 50 μm, 10 μm, 5 μm, 1 μm or 0.5 μm. Other exemplary samples include, but are not limited to, biological specimens (e.g., a nucleic acid, a protein, a cell, a virus, or a tissue), nanoparticles, or electronic chips (e.g., a microprocessor chip). In embodiments, the sample includes a microplate array, including: a substrate including a surface, the surface comprising a plurality of wells separated from each other by interstitial regions on the surface, wherein one or more wells includes a sample (e.g., a cell or tissue sample), particle, or nucleic acid. In embodiments, the sample includes a cell. In embodiments, the sample includes a particle. In embodiments, the sample includes a nucleic acid. In embodiments, the sample is a tissue sample. In embodiments, the sample includes a cell. In embodiments, the surface is substantially free of oligonucleotides. In embodiments, the microplate array includes 2, 4, 6, 12, 24, 48, 96, 384 or 1536 wells. In embodiments, the microplate array includes 24, 48, 96, or 384 wells. In embodiments, the microplate array includes 24 wells. In embodiments, the microplate array includes 48 wells. In embodiments, the microplate array includes 96 wells. In embodiments, the microplate array includes 384 wells. In embodiments, the dimensions of the microplate conform to the standards provided by the American National Standards Institute (ANSI) and Society For Laboratory Automation And Screening (SLAS); for example the tolerances and dimensions set forth in ANSI SLAS 1-2004 (R2012); ANSI SLAS 2-2004 (R2012); ANSI SLAS 3-2004 (R2012); ANSI SLAS 4-2004 (R2012); and ANSI SLAS 6-2012. In embodiments, the microplate has a rectangular shape that measures 127.7 mm±0.5 mm in length by 85.4 mm±0.5 mm in width, and includes 6, 12, 24, 48, or 96 wells. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 5-7 mm. In embodiments, the microplate has a rectangular shape that measures 127.7 mm±0.5 mm in length by 85.4 mm±0.5 mm in width, and includes 6, 12, 24, 48, or 96 wells, wherein each well has an average diameter of about 6 mm.

In embodiments, the imaging system includes one camera and one CCD-CMOS sensor array per channel. In embodiments, the imaging system includes one camera and four CCD-CMOS sensors. In embodiments, the imaging system includes two cameras and two CCD-CMOS sensor arrays. In embodiments, the imaging system architecture includes an upright infinity-corrected epifluorescence microscope that uses two cameras, each of them responsible for capturing two of the four color channels. In embodiments, the imaging path includes a beamsplitter that routes the four fluorescence bands to a first camera or a second camera. In embodiments, each of the branches of the imaging path contains a dual bandpass filter designed specifically to transmit the pair of color channels intended for that branch, and to block the excitation light and out-of-band fluorescence.

Typical implementations within a multicolor image acquisition relies on taking two sequential exposures with red and green excitation light to capture images in multiple channels. In contrast to this, the imaging system described herein images all channels in parallel and relies on spatial separation of excitation light, instead of temporal separation, see FIG. 1 and FIG. 2. An advantage of the systems and methods described herein is that they provide for rapid and efficient detection of a plurality of target nucleic acid in parallel.

In a first configuration workflow, as shown in FIG. 1, a first light source 101 provides a first excitation beam 103 and a second light source 102 provides a second excitation beam 104. Excitation beam 103 is directed by mirror 112, mirror 113, and lens 110 towards dichroic filter 140. Excitation beam 104 is directed by mirror 111, mirror 113, and lens 110 towards dichroic filter 140. Dichroic filter 140 directs excitation beam 103 and excitation beam 104 through objective lens 130 and onto sample 120. The interaction of the excitation beams with a plurality of fluorophores in the sample generates fluorescent emissions 105, 106, 107, and 108. Fluorescent emissions 105, 106, 107, and 108 are reflected by dichroic wedge 141 and transmitted through tube lens 115 and further through bandpass filter 145. Fluorescent emission 105 is transmitted towards sensor array 151, fluorescent emission 106 is transmitted towards sensor array 152, fluorescent emission 107 is transmitted towards sensor array 153, and fluorescent emission 108 is transmitted towards sensor array 154. In some implementations, mirrors 111 and 112 can be oriented relative to the first excitation beam 103 and the second excitation beam 104, respectively, such that the first excitation beam 103 and the second excitation beam 104 are spatially separated. This can allow the first excitation beam 103 to impinge onto a first location of the sample 120, and the second excitation beam 104 to impinge onto a second location of the sample 220. As a result, fluorescent emissions 105 and 106 (generated by the excitation beam 103) are spatially separate from emissions 107 and 108 (generated by the excitation beam 204). In embodiments, the first excitation beam 103 and the second excitation beam 104 are spatially separated by about 10 μm to about 500 μm. In embodiments, the first excitation beam 103 and the second excitation beam 104 are spatially separated by about 10 μm, about 20 μm, about 30 μm, about 40 μm, about 50 μm, about 60 μm, about 70 μm, about 80 μm, about 90 μm, or about 100 μm. In embodiments, the first excitation beam 103 and the second excitation beam 104 are spatially separated by about 1 μm, about 2 μm, about 3 μm, about 4 μm, about 5 μm, about 6 μm, about 7 μm, about 8 μm, about 9 μm, or about 10 μm. In embodiments, the first excitation beam 103 and the second excitation beam 104 are spatially separated by about 30 μm, about 35 μm, about 40 μm, about 45 μm, about 50 μm, about 55 μm, or about 60 μm. In embodiments, the first excitation beam 103 and the second excitation beam 104 are spatially separated by about 50 μm. In embodiments, the first excitation beam 103 and the second excitation beam 104 are spatially separated by about 50 μm, about 51 μm, about 52 μm, about 53 μm, about 54 μm, about 55 μm, about 56 μm, about 57 μm, about 58 μm, about 59 μm, or about 60 μm.

In a second configuration workflow, as shown in FIG. 2, a first light source 201 provides a first excitation beam 203 and a second light source 202 provides a second excitation beam 204. Excitation beam 203 is directed by mirror 212, mirror 213, and lens 210 towards dichroic filter 240. Excitation beam 204 is directed by mirror 211, mirror 213, and lens 210 towards dichroic filter 240. Dichroic filter 240 directs excitation beam 203 and excitation beam 204 through objective lens 230 and onto sample 220. The interaction of the excitation beams with a plurality of fluorophores in the sample generates fluorescent emissions 205, 206, 207, and 208. Fluorescent emissions 205 and 207 are reflected by dichroic beamsplitter 241 through tube lens 215 and further through bandpass filter 245. Fluorescent emission 205 is transmitted towards sensor array 251 and fluorescent emission 207 is transmitted towards sensor array 253. Fluorescent emissions 206 and 208 are reflected by dichroic beamsplitter 241 through tube lens 216 and further through bandpass filter 246. Fluorescent emission 206 is transmitted towards sensor array 252 and fluorescent emission 208 is transmitted towards sensor array 254. In some implementations, mirrors 211 and 212 can be oriented relative to the first excitation beam 203 and the second excitation beam 204, respectively, such that the first excitation beam 203 and the second excitation beam 204 are spatially separated. This can allow the first excitation beam 203 to impinge onto a first location of the sample 220, and the second excitation beam 204 to impinge onto a second location of the sample 220. As a result, fluorescent emissions 205 and 206 (generated by the excitation beam 203) are spatially separate from emissions 207 and 208 (generated by the excitation beam 204).

In embodiments, the objective lens is a microscope objective lens. Exemplary telecentric objective lenses useful in the invention include those that are described in U.S. Pat. No. 5,847,400, which is incorporated herein by reference. In embodiments, the objective lens is an air objective lens. In embodiments, the objective lens is an immersion objective lens. In embodiments, the objective lens has a large numerical aperture (NA) (e.g., NA in a range between 0.95 and 1.5) and performs imaging via air immersion or liquid immersion (e.g., such as water, oil, or other immersion fluids). For example, the NA may be at least about 0.65, 0.7, 0.75, 0.8, 0.85, 0.9, 0.95, or higher. Those skilled in the art will appreciate that NA, being dependent upon the index of refraction of the medium in which the lens is working, may be higher including, for example, up to 1.0 for air, 1.33 for pure water, or higher for other media such as oils. However, other embodiments may have lower NA values than the examples listed above. Image data obtained by the optical assembly may have a resolution that is between 0.1 and 50 microns or, more particularly, between 0.1 and 10 microns. In embodiments, the numerical aperture for the camera is at least 0.2. In embodiments, the numerical aperture for the camera is no greater than 0.8. In embodiments, the numerical aperture for the camera is no greater than 0.5. Image systems described herein may have a resolution that is sufficient to individually resolve the features or sites that are separated by a distance of less than 10 µm, 5 µm, 2 µm, 1.5 µm, 1.0 µm, 0.8 µm, 0.5 µm, or less. In embodiments, the image systems described herein may have a resolution that is sufficient to individually resolve the features or sites that are separated by a distance of 100 µm at most.

In embodiments, each camera includes at least one CCD-CMOS sensor array. The light sensitive pixels are CCD, allowing for noiseless charge transfer from line to line. The readout circuitry is CMOS, making it possible to read out the columns in parallel and allowing high line rate. Each line successively captures a snapshot of the object as it passes, allowing the accumulation of multiple images that can result in a very low noise image of a dark or hard-to-image object. When combined with the power efficiency of CMOS technology, a CCD-CMOS sensor permits ultra-high-speed imaging with excellent light sensitivity.

In embodiments, the CCD-CMOS sensor array is at least 8,000 pixels wide. In embodiments, the CCD-CMOS sensor array is at least 64 pixels long. In embodiments, the CCD-CMOS sensor array is at least 128 pixels long. In embodiments, each pixel has a width and a height in two dimensions (e.g., corresponding to an x and y axis). In embodiments, each pixel is 3 µm wide. In embodiments, each pixel is 4 µm wide. In embodiments, each pixel is 5 µm wide. In embodiments, each pixel is 2 µm wide. In embodiments, each pixel is 1 µm wide. In embodiments, each pixel is 3 µm tall. In embodiments, each pixel is 4 µm tall. In embodiments, each pixel is 5 µm tall. In embodiments, each pixel is 2 µm tall. In embodiments, each pixel is 1 µm tall. In embodiments, the sensor array includes a plurality of pixels. In embodiments, each pixel is approximately square (i.e., each pixel has equal horizontal and vertical sampling pitch). In embodiments, each pixel is approximately rectangular (i.e., each pixel has unequal horizontal and vertical sampling pitch, resulting in an oblong shape).

In embodiments, the sensor array generates an output signal. The output signal of a image sensor is derived from the electrons generated by light incident (e.g., emission) on the photodiode in each pixel. The output voltage of the output signal depends on the transfer of the signal electrons from the photodiode to the readout node. The shape and size of the photodiode is known to control the rate of charge transfer. For example, in large photodiodes it is difficult to fully extract the generated electrons because of the reduction in lateral electric field that pushes the electrons to the transfer transistor. Modulating the shape of the photodiode is known to enhance the transfer (e.g., a triangular shaped photodiode increases the lateral electric field).

In embodiments, the CCD-CMOS sensor array consists of rows of pixels extending transverse to the scan direction, and has the capability to transfer charge from one row to the next at a rate determined by an input synchronization signal. The synchronization signal is generated by the position encoder of the motion stage that moves the object to be imaged (e.g., the sample) under the imaging lens. For example, the sample is translated under the objective at a constant speed. The excitation source illuminates a rectangular area on the sample. As the scan progresses, the fluorescence image of a particular object in the sample is translated on the camera chip (e.g., CCD-CMOS sensor array) at the rate of magnification times the stage scan rate. In embodiments, the sample is scanned at about 1 $mm^2$/sec, 1.5 $mm^2$/sec, 5 $mm^2$/sec, 10 $mm^2$/sec, 50 $mm^2$/sec or 100 $mm^2$/sec. In embodiments, the sample is scanned at 10 $mm^2$/sec, 20 $mm^2$/sec, 30 $mm^2$/sec, 40 $mm^2$/sec, or 50 $mm^2$/sec. In embodiments, the sample is scanned at least 20 $mm^2$/sec.

In embodiments, the system may further include a scanning element, which may be a mechanical, electro-mechanical component, software component, or combination thereof configured to scan the sample along a direction, which may correspond to a scan direction. In an embodiment, the scan direction is orthogonal to the excitation direction of the sample. In an embodiment, the scan direction is non-orthogonal to the excitation beam direction, wherein the orthogonal projected component directly contributes to the final image reconstruction. The term "scanning element" is intended to mean an element capable of sequentially detecting different portions of a sample. A scanning element can operate, by changing the position of one or more components of the system including, for example, the light source the objective lens, the image sensor, or the sample. Exemplary scanning elements include, but are not limited to a galvanometer configured to move a beam (e.g., excitation beam) across a sample or a translation stage configured to move the sample across the beam.

The TDI array (e.g., CCD-CMOS sensor array) imaging systems may also be configured to sequentially detect different portions of a sample by different subsets of elements of the detector array, wherein transfer of charge between the subsets of elements proceeds at a rate synchronized with and in the same direction as the apparent motion of the sample being imaged. For example, CCD-CMOS sensor array imaging systems may scan a sample such that a frame transfer device produces a continuous video image of the sample by means of a stack of linear arrays aligned with and synchronized to the apparent movement of the sample, whereby as the image moves from one line to the next, the stored charge moves along with it. Accumulation of charge can integrate during the entire time required for the row of charge to move from one end of the detector to the serial register (or to the storage area of the device, in the case of a frame transfer CCD).

The system may also include other components, including a collection of lenses (such as a collimating lens, a beam shaping lens (e.g., Powell lens), and a cylindrical lens), mirrors (e.g., a dichromatic mirror), beam splitter, one or more pinhole apertures, excitation filter, or combinations thereof. For example, the direction, size, and/or polarization of the light source may be adjusted by using lenses, mirrors, and/or polarizers. In embodiments, one or more of the components of the system may be adjusted or manipulated automatically. Automatic control devices may include a motorized translation stage, an actuation device, one or more piezo stages, and/or one or more automatic switch and flip mirrors and lenses. In embodiments, the system includes one or more optical components (e.g., a beam shaping lens) configured to shape the light emitted from the one or more light sources into desired patterns. For example, in some embodiments, the optical components may shape the light into line patterns (e.g., by using one or more Powell lenses, or other beam shaping lenses, diffractive, or scattering components). In embodiments, the optical component includes a line generator.

In embodiments, the optical components include a Powell lens, a micro-lens, or micro-lens array. In embodiments, the optical component includes a micro-lens fabricated on glass, metal, or plastic. In embodiments, the excitation beams may be directed through a beam shaping lens or lenses. In some embodiments, a single beam shaping lens may be used to shape the excitation beams output from a plurality light sources (e.g., 2 light sources). In some embodiments, a separate beam shaping lens may be used for each light beam. In embodiments, the beam shaping lens is a Powell lens, alternatively referred to as a Powell prism. The shape of the beam may be shaped into an appropriate geometry according to known techniques, e.g., a line, conical, super-Gaussian, ring, doughnut, Bessel-Gauss, Hermite-Gaussian, Laguerre-Gaussian, Hypergeometric-Gaussian, Ince-Gaussian, and the like. In embodiments, the beam is uniform within acceptable limits (e.g., less than 30% intensity variation across the beam). In embodiments, the beam is profiled or includes a gradient.

A sample refers to an object or location that is intended to be detected. In embodiments, a sample includes a plurality of distinct features that are targets for imaging. In some embodiments a sample includes a non-planar structure with a surface, such as a bead or a well, to which target nucleic acids have been attached as the target features. In embodiments, the sample is held by a sample holder. The sample holder can be a multiwell plate. In some instances, the multiwell plate has 16, 24, 48, 96, 384 or more sample wells. In some of these instances, an array of light sources, e.g., LEDs, has 16, 24, 48, 96, 384 or more corresponding light sources. In some instances, the multiwell plate is a standard microwell plate for biological analysis.

In an aspect is provided a nucleic acid sequencing system, wherein the genetic sequencing system includes the imaging system as described herein. Genetic sequencing systems utilize excitation beams to excite labeled nucleotides in the DNA containing sample to enable analysis of the base pairs present within the DNA. High speed sequencing employs high velocity scanning to deliver excitation beams to the DNA fluorophores, to stimulate sufficient emission of reactive photons from the DNA sample to be detected by the image sensors. Many of the next-generation sequencing (NGS) technologies use a form of sequencing by synthesis (SBS), wherein modified nucleotides are used along with an enzyme to read the sequence of DNA templates in a controlled manner. In embodiments, sequencing comprises a sequencing by synthesis process, where individual nucleotides are identified iteratively, as they are polymerized to form a growing complementary strand. In embodiments, nucleotides added to a growing complementary strand include both a label and a reversible chain terminator that prevents further extension, such that the nucleotide may be identified by the label before removing the terminator to add and identify a further nucleotide. Such reversible chain terminators include removable 3' blocking groups, for example as described in U.S. Pat. Nos. 10,738,072, 7,541, 444 and 7,057,026. Once such a modified nucleotide has been incorporated into the growing polynucleotide chain complementary to the region of the template being sequenced, there is no free 3'-OH group available to direct further sequence extension and therefore the polymerase cannot add further nucleotides. Once the identity of the base incorporated into the growing chain has been determined, the 3' reversible terminator may be removed to allow addition of the next successive nucleotide. In embodiments, the genetic sequencing system utilizes the detection of four different nucleotides that comprise four different labels.

In embodiments, the nucleic acid sequencing system utilizes the detection of four different nucleotides using fewer than four different labels. As a first example, a pair of nucleotide types can be detected at the same wavelength, but distinguished based on a difference in signal states, such as the intensity, for one member of the pair compared to the other, or based on a change to one member of the pair (e.g. via chemical modification, photochemical modification or physical modification) that causes apparent signal to appear or disappear compared to the signal detected for the other member of the pair. As a second example, three of four different nucleotide types can be detected under particular conditions while a fourth nucleotide type lacks a label that is detectable under those conditions, or is minimally detected under those conditions. Incorporation of the first three nucleotide types into a nucleic acid can be determined based on presence of their respective signals and incorporation of the fourth nucleotide type into the nucleic acid can be determined based on absence or minimal detection of any signal. As a third example, one nucleotide type can include label(s) that are detected in two different channels, whereas other nucleotide types are detected in no more than one of the channels.

In an aspect is provided a cell imaging system, wherein the cell imaging system includes the imaging system as described herein. Cell imaging systems utilize excitation beams to detect emissions (e.g., diffracted light, reflected light, refracted light) from a sample comprising a cell (e.g., a sample from a tissue of interest, or from a biopsy, blood sample, or cell culture. Non-limiting examples of samples comprising a cell include fluid or tissue from a subject, including, without limitation, blood or a blood product (e.g., serum, plasma, platelets, buffy coats, or the like), umbilical cord blood, chorionic villi, amniotic fluid, cerebrospinal fluid, spinal fluid, lavage fluid (e.g., lung, gastric, peritoneal, ductal, ear, arthroscopic), a biopsy sample, celocentesis sample, cells (blood cells, lymphocytes, placental cells, stem cells, bone marrow derived cells, embryo or fetal cells) or parts thereof (e.g., mitochondrial, nucleus, extracts, or the like), urine, feces, sputum, saliva, nasal mucous, prostate fluid, lavage, semen, lymphatic fluid, bile, tears, sweat, breast milk, breast fluid, the like or combinations thereof. Non-limiting examples of tissues include organ tissues (e.g., liver, kidney, lung, thymus, adrenals, skin, bladder, reproductive organs, intestine, colon, spleen, brain, the like or parts thereof), epithelial tissue, hair, hair follicles, ducts, canals, bone, eye, nose, mouth, throat, ear, nails, the like, parts thereof or combinations thereof. A sample may comprise cells or tissues that are normal, healthy, diseased (e.g., infected), and/or cancerous (e.g., cancer cells). A sample obtained from a subject may comprise cells or cellular material (e.g., nucleic acids) of multiple organisms (e.g., virus nucleic acid, fetal nucleic acid, bacterial nucleic acid, parasite nucleic acid).

In an aspect is provided a tissue imaging system, wherein the tissue imaging system includes the imaging system as described herein. Tissue imaging systems utilize excitation beams to detect emissions (e.g., diffracted light, reflected light, refracted light) from a sample comprising a tissue (e.g., a sample from a tissue of interest, or from a biopsy, blood sample, or cell culture).

In embodiments, the system (e.g., the nucleic acid sequencing system, the cell imaging system, or the tissue imaging system) includes an integrated system of one or more interconnected chambers, ports, and channels in fluid communication and configured for carrying out an analytical reaction or process, either alone or in cooperation with an appliance or instrument that provides support functions. The reagent aspiration manifold and/or the reagent dispense manifold are in fluidic communication with a fluidic system. The fluid system may store fluids for washing or cleaning the fluidic network of the device, and also for diluting the reactants. For example, the fluid system may include various reservoirs to store reagents, enzymes, other biomolecules, buffer solutions, aqueous, and non-polar solutions. Furthermore, the fluid system may also include waste reservoirs for receiving waste products. As used herein, fluids may be liquids, gels, gases, or a mixture of thereof. Also, a fluid can be a mixture of two or more fluids. The fluidic network may include a plurality of fluidic components (e.g., fluid lines, pumps, aspirators, nozzles, valves, or other fluidic devices, manifolds, reservoirs) configured to have one or more fluids flowing therethrough. In embodiments, the system includes one or more peristaltic pumps. In embodiments, the system includes one or more syringe pumps. In embodiments, the support functions include at least one of sample introduction, fluid and/or reagent driving means, temperature control, detection systems, data collection and integration systems, and are configured to determine the nucleic acid sequence of a template polynucleotide (e.g., a target polynucleotide, optionally comprising a barcode). The device can use pressure drive flow control, e.g., utilizing valves and pumps, to manipulate the flow of reagents, molecules, or enzymes in one or more directions and/or into one or more channels of a device.

In an aspect is provided a method of imaging a cell sample (e.g., a tissue sample comprising a cell). In embodiments, the method includes providing a sample comprising a cell, illuminating the sample using the imaging system described herein, and detecting emissions from the sample (e.g., fluorescent excitation events, scattered light, transmitted light, or reflected light) at an active-pixel sensor array, and scanning the sample in a synchronized manner (i.e., the transfer of both the first and the second charge is synchronized with the sample stage speed).

In embodiments, the method further incudes a step of obtaining a two-dimensional or three-dimensional picture, image, video, or other representation of the physical form or structure of the sample. This representation can be obtained via light field, fluorescence, or other microscopic techniques. In embodiments, the method further includes an additional imaging modality or immunohistochemistry modality (e.g., immunostaining). Immunohistochemistry (IHC) is a powerful technique that exploits the specific binding between an antibody and antigen to detect and localize specific antigens in cells and tissue, commonly detected and examined with the light microscope. Known IHC modalities may be used, such as the protocols described in Magaki, S., Hojat, S. A., Wei, B., So, A., & Yong, W. H. (2019). *Methods in molecular biology* (Clifton, N.J.), 1897, 289-298, which is incorporated herein by reference. In embodiments, the additional imaging modality includes bright field microscopy, phase contrast microscopy, Nomarski differential-interference-contrast microscopy, or dark field microscopy. In embodiments, the method further includes determining the cell morphology (e.g., the cell boundary or cell shape) of a sample comprising one or more cells. For example, determining the cell boundary includes comparing the pixel values of an image to a single intensity threshold, which may be determined quickly using histogram-based approaches as described in Carpenter, A. et al Genome Biology 7, R100 (2006) and Arce, S., Sci Rep 3, 2266 (2013)). Comparison of this representation with spatially resolved nucleic acid detection results can be used to localize genetic information with recognizable features of a tissue. Exemplary methods for spatial detection of nucleic acids that can be modified for use in the system and methods set forth herein are described in US 2014/0066318 which is incorporated herein by reference. In embodiments, the method includes obtaining two-dimensional planes of images by scanning along one axis (e.g., the z direction). For example, multiple two-dimensional planes may be acquired for the same sample in the xy plane whereby detection events may be occurring on different z-planes. In embodiments of the methods provided herein, the method includes imaging through each of the multiple two-dimensional planes at a resolution sufficient to distinguish one imaged plane from an adjacent imaged plane. In embodiments, the methods and devices described herein simultaneously obtain a plurality of depth-resolved optically sectioned images.

In embodiments, the method includes performing an additional image processing techniques (e.g., filtering, masking, smoothing, UnSharp Mask filter (USM), deconvolution, or maximum intensity projection (MIP)). In embodiments, the method includes computationally filtering the emissions using a linear or nonlinear filter that amplifies the high-frequency components of the emission. For example, USM method applies a Gaussian blur to a duplicate of the original image and then compares it to the original. If the difference is greater than a threshold setting, the images are subtracted. In embodiments, the method includes a maximum intensity projection (MIP). A maximum intensity projection is a visualization technique that takes three-dimensional data (e.g., emissions from varying depths within the sample) and turns it into a single two-dimensional image. For example, the projection takes the brightest pixel (voxel) in each depth and displays that pixel intensity value in the final two-dimensional image. Various machine learning approaches may be used, for example, the methods described in Lugagne et al. Sci Rep 8, 11455 (2018) and Pattarone, G., et al. Sci Rep 11, 10304 (2021), each of which is incorporated herein by reference. In embodiments, the method includes focus stacking (e.g., z-stacking) which combines multiple images taken at different focus distances to give a resulting image with a greater depth of field (DOF) than any of the individual source images.

One or more aspects or features of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device (e.g., mouse, touch screen, etc.), and at least one output device. The methods and systems described herein can be implemented or performed by a machine, such as a processor configured with specific instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor. A processor can also be implemented as a combination of computing devices, e.g., a combination of a DSP and a microprocessor, a plurality of microprocessors, one or more microprocessors in conjunction with a DSP core, or any other such configuration. The elements of a method or process as described herein can be implemented within computational hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art.

The computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores. The computer can run any one of a variety of operating systems, such as for example, any one of several versions of Windows, or of MacOS, or of Unix, or of Linux.

With certain aspects, to provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), the Internet, WiFi (IEEE 802.11 standards), NFC, BLUETOOTH, ZIGBEE, and the like.

The computing system may include clients and servers. A client and server are generally remote from each other and typically interact through a communication network. The relationship of client and server arises by virtue of computer programs running on the respective computers and having a client-server relationship to each other.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow(s) depicted in the accompanying figures and/or described herein do not necessarily require the particular order shown, or sequential order, to achieve desirable results. Other implementations may be within the scope of the following claims.

EMBODIMENTS

Embodiment 1. An imaging system comprising: a sample stage moving at a sample stage speed, wherein the sample stage is configured to receive a sample comprising a first fluorophore and a second fluorophore; a first sensor array and a second sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, and the interaction of the second excitation beam with the second fluorophore generates a second fluorescent emission; a second optical system configured to direct the first fluorescent emission to the first sensor array, and the second fluorescent emission to the second sensor array, wherein the first fluorescent emission impinges upon and generates a first charge that transfers across the first sensor array, wherein the second fluorescent emission impinges upon and generates a second charge that transfers across the second sensor array; and wherein the transfer of both the first and the second charge is synchronized with the sample stage speed.

Embodiment 2. The imaging system of Embodiment 1, further comprising: a third fluorophore, and a fourth fluorophore; a third sensor array, and a fourth sensor array, wherein the interaction of the first excitation beam with the third fluorophore generates a third fluorescent emission, and the interaction of the second excitation beam with a fourth fluorophore generates a fourth fluorescent emission; wherein the second optical system is configured to direct the third fluorescent emission to the third sensor array and the fourth fluorescent emission to the fourth sensor array, wherein the third fluorescent emission impinges upon and generates a third charge that transfers across the third sensor array, wherein the fourth fluorescent emission impinges upon and generates a fourth charge that transfers across the fourth sensor array, wherein the transfer of at least one of the third and the fourth charge is synchronized with the sample stage speed.

Embodiment 3. An imaging system comprising: a sample stage moving at a sample stage speed, wherein the sample stage comprises a sample comprising a first fluorophore, a second fluorophore, a third fluorophore, and a fourth fluorophore; a first sensor array, second sensor array, third sensor array, and a fourth sensor array; a first light source configured to provide a first excitation beam and a second light source configured to provide a second excitation beam; a first optical system configured to direct a first excitation beam and second excitation beam onto a sample, wherein the interaction of the first excitation beam with the first fluorophore generates a first fluorescent emission, the interaction of the second excitation beam with the second fluorophore generates a second fluorescent emission, the interaction of the first excitation beam with a third fluorophore generates a third fluorescent emission, and the interaction of the second excitation beam with a fourth fluorophore generates a fourth fluorescent emission; a second optical system configured to direct the first fluorescent emission to the first sensor array, the second fluorescent emission to the second sensor array, the third fluorescent emission to the third sensor array, the fourth fluorescent emission to the fourth sensor array, wherein the first fluorescent emission impinges upon and generates a first charge that transfers across the first sensor array, wherein the second fluorescent emission impinges upon and generates a second charge that transfers across the second sensor array, wherein the third fluorescent emission impinges upon and generates a third charge that transfers across the third sensor array, wherein the fourth fluorescent emission impinges upon and generates a fourth charge that transfers across the fourth sensor array, wherein the transfer of at least one of the first, the second, the third and the fourth charge is synchronized with the sample stage speed.

Embodiment 4. The imaging system of any one Embodiments 1 to 3, wherein the first optical system is configured to direct the first excitation beam to a first region of the sample and direct the second excitation beam to a second region of the sample, wherein the first region and second region are separated by at least about 10 µm to about 500 µm.

Embodiment 5. The imaging system of Embodiments 2 to 4, wherein the second optical system comprises a first optical element including: a first surface configured to reflect the first fluorescent emission towards the first sensor array, and reflect the third fluorescent emission towards the third sensor array; and a second surface configured to reflect the second fluorescent emission towards the second sensor array, and reflect the fourth fluorescent emission towards the fourth sensor array.

Embodiment 6. The imaging system of Embodiment 5, wherein the second optical system comprises a second optical element downstream from the first optical element and configured to focus the first fluorescent emission, the second fluorescent emission, the third fluorescent emission, and the fourth fluorescent emission.

Embodiment 7. The imaging system of Embodiment 6, wherein the second optical system comprises a band pass filter configured to selectively transmit the first fluorescent emission, the second fluorescent emission, the third fluorescent emission, and the fourth fluorescent emission.

Embodiment 8. The imaging system of Embodiment 7, wherein a detection camera includes the first sensor array, the second sensor array, the third sensor array, and the fourth sensor array.

Embodiment 9. The imaging system of Embodiment 5, wherein the first optical element is a dichroic wedge.

Embodiment 10. The imaging system of Embodiments 2 to 4, wherein the second optical system comprises a first optical element configured to reflect the first fluorescent emission towards the first sensor array, and reflect the third fluorescent emission towards the third sensor array; and transmit the second fluorescent emission towards the second sensor array, and transmit the fourth fluorescent emission towards the fourth sensor array.

Embodiment 11. The imaging system of Embodiment 10, wherein the second optical system comprises: a first lens downstream from the first optical element and configured to focus the first fluorescent emission and the third fluorescent emission; and a second lens downstream from the first optical element and configured to focus the second fluorescent emission and the fourth fluorescent emission.

Embodiment 12. The imaging system of Embodiment 11, wherein the second optical system comprises: a first band pass filter configured to selectively transmit the first fluorescent emission and the third fluorescent emission; and a second band pass filter configured to selectively transmit the second fluorescent emission and the fourth fluorescent emission.

Embodiment 13. The imaging system of Embodiment 12, wherein a first detection camera includes the first sensor array and the third sensor array, and a second detection camera includes the second sensor array and the fourth sensor array.

Embodiment 14. The imaging system of Embodiment 10, wherein the first optical element is a dichroic beamsplitter.

Embodiment 15. The imaging system of one of Embodiments 1 to 14, wherein each sensor array is a TDI sensor array.

Embodiment 16. The imaging system of one of Embodiments 1 to 15, wherein each sensor array is about 1,000 to 20,000 pixels wide.

Embodiment 17. The imaging system of one of Embodiments 1 to 15, wherein each sensor array is about 3,000 to 10,000 pixels wide.

Embodiment 18. The imaging system of one of Embodiments 1 to 15, wherein each sensor array is about 5,000 to 8,000 pixels wide.

Embodiment 19. The imaging system of one of Embodiments 1 to 15, wherein each sensor array is about 5,500 pixels wide.

Embodiment 20. The imaging system of one of Embodiments 1 to 15, wherein each sensor array is about 1,000 to 20,000 pixels wide and about 10 to 300 pixels long.

Embodiment 21. The imaging system of one of Embodiments 1 to 15, wherein each sensor array is about 3,000 to 10,000 pixels wide and about 10 to 300 pixels long.

Embodiment 22. The imaging system of one of Embodiments 1 to 15, wherein each sensor array is about 5,000 to 10,000 pixels wide and about 30 to 300 pixels long.

Embodiment 23. The imaging system of one of Embodiments 1 to 15, wherein each sensor array is about 8,000 pixels wide and about 128 pixels long.

Embodiment 24. The imaging system of one of Embodiments 1 to 23, wherein the sample stage is a motorized translation stage.

Embodiment 25. The imaging system of one of Embodiments 1 to 24, wherein the sample stage comprises a position encoder, wherein the position encoder generates a synchronization signal that synchronizes the transfer of the charges.

Embodiment 26. The imaging system of one of Embodiments 1 to 25, further comprising a collimating lens, a beam shaping lens, or a cylindrical lens.

Embodiment 27. The imaging system of one of Embodiments 1 to 26, further comprising one or more line generators.

Embodiment 28. The imaging system of one of Embodiments 1 to 26, further comprising two line generators.

Embodiment 29. A method of imaging a sample comprising: a) directing a first excitation beam and a second excitation beam onto a sample, wherein said sample is on a sample stage moving at a sample stage speed, wherein the sample comprises a first fluorophore that generates a first fluorescent emission and a second fluorophore that generates a second fluorescent emission following interaction with a first excitation beam and a second excitation beam, respectively; b) directing said first fluorescent emission to impinge upon and generate a first charge that transfers across a first sensor array at a first charge speed, and directing said second fluorescent emission to impinge upon and generate a second charge that transfers across a second sensor array at a second charge speed, wherein at least one of the first charge speed and the second charge speed is synchronized with the sample stage speed; and c) scanning the sample in a scan dimension and repeating step a) and step b) to form an image of the sample.

Embodiment 30. The method of Embodiment 29, wherein the sample further comprises a third fluorophore that generates a third fluorescent emission and a fourth fluorophore that generates a fourth fluorescent emission following interaction with a first excitation beam and a second excitation beam, respectively; and directing said third fluorescent emission to impinge upon and generate a third charge that transfers across a third sensor array at a third charge speed, and directing said fourth fluorescent emission to impinge upon and generate a fourth charge that transfers across a fourth sensor array at a fourth charge speed.

Embodiment 31. The method of Embodiment 30, wherein the method comprises imaging the sample comprising four different fluorophores simultaneously.

Embodiment 32. The method of Embodiments 30 or 31, wherein the first excitation beam and the second excitation beam comprise an excitation line.

Embodiment 33. The method of one of Embodiments 30 to 32, wherein scanning the sample comprises moving the sample stage.

Embodiment 34. The method of one of Embodiments 30 to 33, wherein scanning the sample comprises moving the sample stage at a constant speed.

Embodiment 35. The method of one of Embodiments 30 to 34, further comprising storing a data representation of said image of said sample in a computer readable memory.

Embodiment 36. The method of one of Embodiments 30 to 35, wherein the excitation beam comprises UV radiation, VIS radiation, or IR radiation.

Embodiment 37. The method of one of Embodiments 30 to 36, wherein the excitation beam comprises excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

Embodiment 38. The method of one of Embodiments 30 to 37, wherein the sample comprises modified nucleotides.

Embodiment 39. The method of one of Embodiments 30 to 38, wherein the sample comprises an array having a plurality of individual sites.

I. Definitions

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art. The following definitions are provided to facilitate understanding of certain terms used frequently herein and are not meant to limit the scope of the present disclosure.

As used herein, the singular terms "a", "an", and "the" include the plural reference unless the context clearly indicates otherwise. Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

Reference throughout this specification to, for example, "one embodiment", "an embodiment", "another embodiment", "a particular embodiment", "a related embodiment", "a certain embodiment", "an additional embodiment", or "a further embodiment" or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term "about" means a range of values including the specified value, which a person of ordinary skill in the art would consider reasonably similar to the specified value. In embodiments, the term "about" means within a standard deviation using measurements generally acceptable in the art. In embodiments, about means a range extending to +/−10% of the specified value. In embodiments, about means the specified value.

Throughout this specification, unless the context requires otherwise, the words "comprise", "comprises" and "comprising" will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that no other elements are optional and may or may not be present depending upon whether or not they affect the activity or action of the listed elements.

As used herein, the term "nucleic acid" refers to nucleotides (e.g., deoxyribonucleotides or ribonucleotides) and polymers thereof in either single-, double- or multiple-stranded form, or complements thereof. The terms "polynucleotide," "oligonucleotide," "oligo" or the like refer, in the usual and customary sense, to a sequence of nucleotides. The term "nucleotide" refers, in the usual and customary sense, to a single unit of a polynucleotide, e.g., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA with linear or circular framework. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer.

Polynucleotides useful in the methods of the disclosure may comprise natural nucleic acid sequences and variants thereof, artificial nucleic acid sequences, or a combination of such sequences.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term "polynucleotide sequence" is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

As used herein, the term "polynucleotide template" refers to any polynucleotide molecule that may be bound by a polymerase and utilized as a template for nucleic acid synthesis. As used herein, the term "polynucleotide primer" or "primer" refers to any polynucleotide molecule that may hybridize to a polynucleotide template, be bound by a polymerase, and be extended in a template-directed process for nucleic acid synthesis, such as in a PCR or sequencing reaction. Polynucleotide primers attached to a core polymer within a core are referred to as "core polynucleotide primers."

In general, the term "target polynucleotide" refers to a nucleic acid molecule or polynucleotide in a starting population of nucleic acid molecules having a target sequence whose presence, amount, and/or nucleotide sequence, or changes in one or more of these, are desired to be determined. In general, the term "target sequence" refers to a nucleic acid sequence on a single strand of nucleic acid. The target sequence may be a portion of a gene, a regulatory sequence, genomic DNA, cDNA, RNA including mRNA, miRNA, rRNA, or others. The target sequence may be a target sequence from a sample or a secondary target such as a product of an amplification reaction. A target polynucleotide is not necessarily any single molecule or sequence. For example, a target polynucleotide may be any one of a plurality of target polynucleotides in a reaction, or all polynucleotides in a given reaction, depending on the reaction conditions. For example, in a nucleic acid amplification reaction with random primers, all polynucleotides in a reaction may be amplified. As a further example, a collection of targets may be simultaneously assayed using polynucleotide primers directed to a plurality of targets in a single reaction. As yet another example, all or a subset of polynucleotides in a sample may be modified by the addition of a primer-binding sequence (such as by the ligation of adapters containing the primer binding sequence), rendering each modified polynucleotide a target polynucleotide in a reaction with the corresponding primer polynucleotide(s).

As used herein, the term "flow cell" refers to the reaction vessel in a nucleic acid sequencing device. The flow cell is typically a glass slide containing small fluidic channels (e.g., a glass slide 75 mm×25 mm×1 mm having one or more channels), through which sequencing solutions (e.g., polymerases, nucleotides, and buffers) may traverse. Though typically glass, suitable flow cell materials may include polymeric materials, plastics, silicon, quartz (fused silica), Borofloat® glass, silica, silica-based materials, carbon, metals, an optical fiber or optical fiber bundles, sapphire, or plastic materials such as COCs and epoxies. The particular material can be selected based on properties desired for a particular use. For example, materials that are transparent to a desired wavelength of radiation are useful for analytical techniques that will utilize radiation of the desired wavelength. Conversely, it may be desirable to select a material that does not pass radiation of a certain wavelength (e.g., being opaque, absorptive, or reflective). In embodiments, the material of the flow cell is selected due to the ability to conduct thermal energy. In embodiments, a flow cell includes inlet and outlet ports and a flow channel extending therebetween.

A "line generator" as used herein refers to an optical component that is configured to generate a diffraction-limited or near diffraction-limited excitation beam in the plane perpendicular to the optical axis of propagation with a substantially uniform intensity distribution along the horizontal axis of the line. Exemplary line generators include, but are not limited to, a one dimensional diffuser having angular uniformity, cylindrical micro-lens array, diffractive element or aspheric refractive lens such as a Powell lens.

As used herein, the term "substrate" refers to a solid support material. The substrate can be non-porous or porous. The substrate can be rigid or flexible. A nonporous substrate generally provides a seal against bulk flow of liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Particularly useful solid supports for some embodiments have at least one surface located within a flow cell. The term "surface" is intended to mean an external part or external layer of a substrate. The surface can be in contact with another material such as a gas, liquid, gel, polymer, organic polymer, second surface of a similar or different material, metal, or coat. The surface, or regions thereof, can be substantially flat. The substrate and/or the surface can have surface features such as wells, pits, channels, ridges, raised regions, pegs, posts or the like. The term "well" refers to a discrete concave feature in a substrate having a surface opening that is completely surrounded by interstitial region(s) of the surface. Wells can have any of a variety of shapes at their opening in a surface including but not limited to round, elliptical, square, polygonal, or star shaped (e.g., star shaped with any number of vertices). The cross section of a well taken orthogonally with the surface may be curved, square, polygonal, hyperbolic, conical, or angular.

As used herein, the terms "sequencing", "sequence determination", "determining a nucleotide sequence", and the like include determination of a partial or complete sequence information (e.g., a sequence) of a polynucleotide being sequenced, and particularly physical processes for generating such sequence information. That is, the term includes sequence comparisons, consensus sequence determination, contig assembly, fingerprinting, and like levels of information about a target polynucleotide, as well as the express identification and ordering of nucleotides in a target polynucleotide. The term also includes the determination of the identification, ordering, and locations of one, two, or three of the four types of nucleotides within a target polynucleotide. In some embodiments, a sequencing process described herein comprises contacting a template and an annealed primer with a suitable polymerase under conditions suitable for polymerase extension and/or sequencing. The sequencing methods are preferably carried out with the target polynucleotide arrayed on a solid substrate within a flow cell (e.g., within a channel of the flow cell). In an embodiment, the sequencing is sequencing by synthesis (SBS). Briefly, SBS methods involve contacting target nucleic acids with one or more labeled nucleotides (e.g., fluorescently labeled) in the presence of a DNA polymerase. Optionally, the labeled nucleotides can further include a reversible termination property that terminates extension once the nucleotide has been incorporated. Thus, for embodiments that use reversible termination, a cleaving solution can be delivered to the flow cell (before or after detection occurs). Washes can be carried out between the various delivery steps. The cycle can then be repeated n times to extend the primer by n nucleotides, thereby detecting a sequence of length n.

Exemplary SBS procedures and detection platforms that can be readily adapted for use with the methods of the present disclosure are described, for example, in Bentley et al., Nature 456:53-59 (2008), WO 2004/018497; and WO 2007/123744, each of which is incorporated herein by reference in its entirety. In an embodiment, sequencing is pH-based DNA sequencing. The concept of pH-based DNA sequencing, has been described in the literature, including the following references that are incorporated by reference: US2009/0026082; and Pourmand et al, Proc. Natl. Acad. Sci., 103: 6466-6470 (2006) which are incorporated herein by reference in their entirety. Other sequencing procedures that use cyclic reactions can be used, such as pyrosequencing. Sequencing-by-ligation reactions are also useful including, for example, those described in Shendure et al. Science 309:1728-1732 (2005).

As used herein, the term "feature" refers a point or area in a pattern that can be distinguished from other points or areas according to its relative location. An individual feature can include one or more polynucleotides. For example, a feature can include a single target nucleic acid molecule having a particular sequence or a feature can include several nucleic acid molecules having the same sequence (and/or complementary sequence, thereof). Different molecules that are at different features of a pattern can be differentiated from each other according to the locations of the features in the pattern. Non-limiting examples of features include wells in a substrate, particles (e.g., beads) in or on a substrate, polymers in or on a substrate, projections from a substrate, ridges on a substrate, or channels in a substrate.

The term "image" is used according to its ordinary meaning and refers to a representation of all or part of an object. The representation may be an optically detected reproduction. For example, an image can be obtained from fluorescent, luminescent, scatter, or absorption signals. The part of the object that is present in an image can be the surface or other xy plane of the object. Typically, an image is a 2-dimensional representation of a 3 dimensional object. An image may include signals at differing intensities (i.e., signal levels). An image can be provided in a computer readable format or medium. An image is derived from the collection of focus points of light rays coming from an object (e.g., the sample), which may be detected by any image sensor.

As used herein, the term "signal" is intended to include, for example, fluorescent, luminescent, scatter, or absorption impulse or electromagnetic wave transmitted or received. Signals can be detected in the ultraviolet (UV) range (about 200 to 390 nm), visible (VIS) range (about 391 to 770 nm), infrared (IR) range (about 0.771 to 25 microns), or other range of the electromagnetic spectrum. The term "signal level" refers to an amount or quantity of detected energy or coded information. For example, a signal may be quantified by its intensity, wavelength, energy, frequency, power, luminance, or a combination thereof. Other signals can be quantified according to characteristics such as voltage, current, electric field strength, magnetic field strength, frequency, power, temperature, etc. Absence of signal is understood to be a signal level of zero or a signal level that is not meaningfully distinguished from noise.

The term "xy coordinates" refers to information that specifies location, size, shape, and/or orientation in an xy plane. The information can be, for example, numerical coordinates in a Cartesian system. The coordinates can be provided relative to one or both of the x and y axes or can be provided relative to another location in the xy plane (e.g., a fiducial). The term "xy plane" refers to a 2 dimensional area defined by straight line axes x and y. When used in reference to a detecting apparatus and an object observed by the detector, the xy plane may be specified as being orthogonal to the direction of observation between the detector and object being detected. The terms "z-axis" and "z direction" are intended to be used consistently with their use in the art of microscopy and imaging systems in general, in which the z-axis refers to the focal axis. Accordingly, a z-axis translation results in increasing or decreasing the length of the focal axis. A z-axis translation can be carried out, for example, by moving a sample stage relative to an optical stage (e.g., by moving the sample stage or an optical element or both).

As used herein, the terms "cluster" and "colony" are used interchangeably to refer to a discrete site on a solid support that includes a plurality of immobilized polynucleotides and a plurality of immobilized complementary polynucleotides. The term "clustered array" refers to an array formed from such clusters or colonies. In this context the term "array" is not to be understood as requiring an ordered arrangement of clusters. The term "array" is used in accordance with its ordinary meaning in the art, and refers to a population of different molecules that are attached to one or more solid-phase substrates such that the different molecules can be differentiated from each other according to their relative location. A flow cell may include an array and can include different molecules that are each located at different addressable features on a solid-phase substrate. The molecules of the array can be nucleic acid primers, nucleic acid probes, nucleic acid templates or nucleic acid enzymes such as polymerases or ligases. Arrays useful in the invention can have densities that ranges from about 2 different features to many millions, billions or higher. The density of an array can be from 2 to as many as a billion or more different features per square cm. For example an array can have at least about 100 features/cm$^2$, at least about 1,000 features/cm$^2$, at least about 10,000 features/cm$^2$, at least about 100,000 features/cm$^2$, at least about 10,000,000 features/cm$^2$, at least about 100,000,000 features/cm$^2$, at least about 1,000,000,000 features/cm$^2$, at least about 2,000,000,000 features/cm$^2$ or higher. In embodiments, the arrays have features at any of a variety of densities including, for example, at least about 10 features/cm$^2$, 100 features/cm$^2$, 500 features/cm$^2$, 1,000 features/cm$^2$, 5,000 features/cm$^2$, 10,000 features/cm$^2$, 50,000 features/cm$^2$, 100,000 features/cm$^2$, 1,000,000 features/cm$^2$, 5,000,000 features/cm$^2$, or higher. Clustering refers to the process of generating clusters (i.e., solid-phase amplification of polynucleotides).

The term "nucleic acid sequencing device" means an integrated system of one or more chambers, ports, and channels that are interconnected and in fluid communication and designed for carrying out an analytical reaction or process, either alone or in cooperation with an appliance or instrument that provides support functions, such as sample introduction, fluid and/or reagent driving means, temperature control, detection systems, data collection and/or integration systems, for the purpose of determining the nucleic acid sequence of a template polynucleotide. Nucleic acid sequencing devices may further include valves, pumps, and specialized functional coatings on interior walls. Nucleic acid sequencing devices may include a receiving unit, or platen, that orients the flow cell such that a maximal surface area of the flow cell is available to be exposed to an optical lens. Other nucleic acid sequencing devices include those provided by Illumina™, Inc. (e.g. HiSeq™, MiSeq™, NextSeq™, or NovaSeq™ systems), Life Technologies™ (e.g. ABI PRISM™, or SOLiD™ systems), Pacific Biosciences (e.g. systems using SMRT™ Technology such as the Sequel™ or RS II™ systems), or Qiagen (e.g. Genereader™ system). Nucleic acid sequencing devices may further include fluidic reservoirs (e.g., bottles), valves, pressure sources, pumps, sensors, control systems, valves, pumps, and specialized functional coatings on interior walls. In embodiments, the device includes a plurality of a sequencing reagent reservoirs and a plurality of clustering reagent reservoirs. In embodiments, the clustering reagent reservoir includes amplification reagents (e.g., an aqueous buffer containing enzymes, salts, and nucleotides, denaturants, crowding agents, etc.) In embodiments, the reservoirs include sequencing reagents (such as an aqueous buffer containing enzymes, salts, and nucleotides); a wash solution (an aqueous buffer); a cleave solution (an aqueous buffer containing a cleaving agent, such as a reducing agent); or a cleaning solution (a dilute bleach solution, dilute NaOH solution, dilute HCl solution, dilute antibacterial solution, or water). The fluid of each of the reservoirs can vary. The fluid can be, for example, an aqueous solution which may contain buffers (e.g., saline-sodium citrate (SSC), ascorbic acid, tris(hydroxymethyl)aminomethane or "Tris"), aqueous salts (e.g., KCl or (NH4)2SO4)), nucleotides, polymerases, cleaving agent (e.g., tri-n-butyl-phosphine, triphenyl phosphine and its sulfonated versions (i.e., tris(3-sulfophenyl)-phosphine, TPPTS), and tri(carboxyethyl)phosphine (TCEP) and its salts, cleaving agent scavenger compounds (e.g., 2'-Dithiobisethanamine or 11-Azido-3,6,9-trioxaundecane-1-amine), chelating agents (e.g., EDTA), detergents, surfactants, crowding agents, or stabilizers (e.g., PEG, Tween, BSA). Non-limited examples of reservoirs include cartridges, pouches, vials, containers, and eppendorf tubes. In embodiments, the device is configured to perform fluorescent imaging. In embodiments, the device includes one or more light sources (e.g., one or more lasers). In embodiments, the illuminator or light source is a radiation source (i.e., an origin or generator of propagated electromagnetic energy) providing incident light to the sample. A radiation source can include an illumination source producing electromagnetic radiation in the ultraviolet (UV) range (about 200 to 390 nm), visible (VIS) range (about 390 to 770 nm), or infrared (IR) range (about 0.77 to 25 microns), or other range of the electromagnetic spectrum. In embodiments, the illuminator or light source is a lamp such as an arc lamp or quartz halogen lamp. In embodiments, the illuminator or light source is a coherent light source. In embodiments, the light source is a laser, LED (light emitting diode), a mercury or tungsten lamp, or a super-continuous diode. In embodiments, the light source provides excitation beams having a wavelength between 200 nm to 1500 nm. In embodiments, the laser provides excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm. In embodiments, the illuminator or light source is a light-emitting diode (LED). The LED can be, for example, an Organic Light Emitting Diode (OLED), a Thin Film Electroluminescent Device (TFELD), or a Quantum dot based inorganic organic LED. The LED can include a phosphorescent OLED (PHOLED). In embodiments, the nucleic acid sequencing device includes an imaging system (e.g., an imaging system as described herein). The imaging system capable of exciting one or more of the identifiable labels (e.g., a fluorescent label) linked to a nucleotide and thereafter obtain image data for the identifiable labels. The image data (e.g., detection data) may be analyzed by another component within the device. The imaging system may include a system described herein and may include a fluorescence spectrophotometer including an objective lens and/or a solid-state imaging device. The solid-state imaging device may include a charge coupled device (CCD) and/or a complementary metal oxide semiconductor (CMOS).

As used herein, the term "label" or "labels" generally refer to molecules that can directly or indirectly produce or result in a detectable signal either by themselves or upon interaction with another molecule. A label moiety can be any moiety that allows the sample to be detected, for example, using a spectroscopic method. Exemplary label moieties are fluorescent labels, mass labels, chemiluminescent labels, electrochemical labels, detectable labels and the like. Non-limiting examples of detectable labels include labels comprising fluorescent dyes, biotin, digoxin, haptens, and epitopes. In general, a dye is a molecule, compound, or substance that can provide an optically detectable signal, such as a colorimetric, luminescent, bioluminescent, chemiluminescent, phosphorescent, or fluorescent signal. In embodiments, the dye is a fluorescent dye. Non-limiting examples of dyes, some of which are commercially available, include CF dyes (Biotium, Inc.), Alexa Fluor dyes (Thermo Fisher), DyLight dyes (Thermo Fisher), Cy dyes (GE Healthscience), IRDyes (Li-Cor Biosciences, Inc.), and HiLyte dyes (Anaspec, Inc.). In embodiments, the label is a fluorophore. Examples of detectable agents (e.g., labels) include imaging agents, including fluorescent and luminescent substances, molecules, or compositions, including, but not limited to, a variety of organic or inorganic small molecules commonly referred to as "dyes," "labels," or "indicators." Examples include fluorescein, rhodamine, acridine dyes, Alexa dyes, and cyanine dyes. In embodiments, the detectable moiety is a fluorescent molecule (e.g., acridine dye, cyanine, dye, fluorine dye, oxazine dye, phenanthridine dye, or rhodamine dye). In embodiments, the detectable moiety is a fluorescent molecule (e.g., acridine dye, cyanine, dye, fluorine dye, oxazine dye, phenanthridine dye, or rhodamine dye).

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed within the invention. The upper and lower limits of any such smaller range (within a more broadly recited range) may independently be included in the smaller ranges, or as particular values themselves, and are also encompassed within the invention, subject to any specifically excluded limit in the stated range. Where the stated range includes one or both of the limits, ranges excluding either or both of those included limits are also included in the invention.

The term "optical filter" refers to a device for selectively passing or rejecting passage of radiation in a wavelength, polarization, or frequency dependent manner. In embodiments, an optical filter is a dichroic filter or dielectric filter. The fluorescence from different fluorophores could be further separated by dichromatic optical elements and projected into spatially separated lines on the sensor array. To further suppress the background from out-of-the-focus fluorescence signal, an optical filter with multiple stripe patterns may be placed in front of the camera to pass only the selected fluorescence lines and reject the unwanted ones. An optical filter is used in accordance with its plain ordinary meaning in the art and refers to a device for selectively passing or rejecting the passage of light having a particular wavelength, polarization or frequency. The term can include an interference filter in which multiple layers of dielectric materials pass or reflect light according to constructive or destructive interference between reflections from the various layers. Interference filters are also referred to in the art as dichroic filters, or dielectric filters. The term can include an absorptive filter which prevents the passage of light having a selective wavelength or wavelength range by absorption. Absorptive filters include, for example, colored glass or liquid. A filter can have one or more particular filter transmission characteristics including, for example, bandpass, short pass and long pass. A band pass filter selectively passes light in a wavelength range defined by a center wavelength of maximum radiation transmission ($T_{max}$) and a bandwidth and blocks passage of light outside of this range. $T_{max}$ defines the percentage of radiation transmitted at the center wavelength. The bandwidth is typically described as the full width at half maximum (FWHM) which is the range of wavelengths passed by the filter at a transmission value that is half of $T_{max}$. A band pass filter can have a FWHM of 10 nanometers (nm), 20 nm, 30 nm, 40 nm or 50 nm. A long pass filter selectively passes higher wavelength light as defined by a $T_{max}$ and a cut on wavelength. The cut on wavelength is the wavelength at which light transmission is half of $T_{max}$, when the wavelength increases above the cut on wavelength, transmission percentage increases and as wavelength decreases below the cut on wavelength transmission percentage decreases. A short pass filter selectively passes lower wavelength radiation as defined by a $T_{max}$ and a cut off wavelength. The cut off wavelength is the wavelength at which light transmission is half of $T_{max}$; as wavelength increases above the cut off wavelength, transmission percentage decreases and as wavelength decreases below the cut off wavelength transmission percentage increases. A filter can have a $T_{max}$ of 50-100%, 60-90% or 70-80%.

The term "synchronize" is used in accordance with its ordinary meaning and refers to events that co-occur. For example, the sample stage is configured to synchronize with the charge transfer across the sensor array, such that the sample stage is configured to move in concert with the charge transfer. In embodiments, synchrony does not require the sample stage move at the same rate as the charge transfer. In embodiments, the sample stage moves at a stage rate and the charge transfers across the sensor array at a charge transfer rate, wherein the stage rate and the charge transfer rate are associated (e.g., the stage rate is a fraction or ratio of the charge transfer rate). In embodiments, synchronized events contemporaneously occur. In embodiments, the sample stage is configured to move at approximately the same speed as the charge transfer. In embodiments, the charge transfer rate is 1000 ns (nanoseconds)/μm, 500 ns (nanoseconds)/μm, 100 ns (nanoseconds)/μm, 50 ns (nanoseconds)/μm, or less (e.g., 40 ns (nanoseconds)/μm). In embodiments, the sample is scanned at about 1 mm²/sec, 1.5 mm²/sec, 5 mm²/sec, 10 mm²/sec, 50 mm²/sec or 100 mm²/sec wherein the scan rate is associated with the charge transfer rate.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. An imaging system comprising:
a sample stage moving at a sample stage speed, wherein the sample stage comprises a sample comprising a first fluorophore, a second fluorophore, a third fluorophore, and a fourth fluorophore;
a first sensor array, second sensor array, third sensor array, and a fourth sensor array;
a first light source configured to provide a first excitation beam and a second light source configured to provide a second excitation beam;
a first optical system configured to direct a first excitation beam and second excitation beam onto a sample, wherein the interaction of the first excitation beam with the first fluorophore generates a first fluorescent emission, the interaction of the second excitation beam with the second fluorophore generates a second fluorescent emission, the interaction of the first excitation beam with a third fluorophore generates a third fluorescent emission, and the interaction of the second excitation beam with a fourth fluorophore generates a fourth fluorescent emission;
a second optical system configured to direct the first fluorescent emission to the first sensor array, the second fluorescent emission to the second sensor array, the third fluorescent emission to the third sensor array, the fourth fluorescent emission to the fourth sensor array, wherein the first fluorescent emission impinges upon and generates a first charge that transfers across the first sensor array, wherein the second fluorescent emission impinges upon and generates a second charge that transfers across the second sensor array, wherein the third fluorescent emission impinges upon and generates a third charge that transfers across the third sensor array, wherein the fourth fluorescent emission impinges upon and generates a fourth charge that transfers across the fourth sensor array,
wherein the transfer of the first, the second, the third and the fourth charge is synchronized with the sample stage speed.

2. The imaging system claim 1, wherein the first optical system is configured to direct the first excitation beam to a first region of the sample and direct the second excitation beam to a second region of the sample, wherein the first region and second region are separated by about 10 µm to about 500 µm.

3. The imaging system claim 1, wherein the second optical system comprises a first optical element including:
a first surface configured to reflect the first fluorescent emission towards the first sensor array, and reflect the third fluorescent emission towards the third sensor array; and
a second surface configured to reflect the second fluorescent emission towards the second sensor array, and reflect the fourth fluorescent emission towards the fourth sensor array.

4. The imaging system of claim 3, wherein the second optical system comprises a second optical element downstream from the first optical element and configured to focus the first fluorescent emission, the second fluorescent emission, the third fluorescent emission, and the fourth fluorescent emission.

5. The imaging system of claim 4, wherein the second optical system comprises a band pass filter configured to selectively transmit the first fluorescent emission, the second fluorescent emission, the third fluorescent emission, and the fourth fluorescent emission.

6. The imaging system of claim 5, wherein a detection camera includes the first sensor array, the second sensor array, the third sensor array, and the fourth sensor array.

7. The imaging system of claim 3, wherein the first optical element is a dichroic wedge.

8. The imaging system claim 1, wherein the second optical system comprises a first optical element configured to reflect the first fluorescent emission towards the first sensor array, and reflect the third fluorescent emission towards the third sensor array; and
transmit the second fluorescent emission towards the second sensor array, and transmit the fourth fluorescent emission towards the fourth sensor array.

9. The imaging system of claim 8, wherein the second optical system comprises:
a first lens downstream from the first optical element and configured to focus the first fluorescent emission and the third fluorescent emission; and
a second lens downstream from the first optical element and configured to focus the second fluorescent emission and the fourth fluorescent emission.

10. The imaging system of claim 8, wherein the second optical system comprises:
a first band pass filter configured to selectively transmit the first fluorescent emission and the third fluorescent emission; and
a second band pass filter configured to selectively transmit the second fluorescent emission and the fourth fluorescent emission.

11. The imaging system of claim 8, wherein a first detection camera includes the first sensor array and the third sensor array, and a second detection camera includes the second sensor array and the fourth sensor array.

12. The imaging system of claim 8, wherein the first optical element is a dichroic beamsplitter.

13. The imaging system claim 1, wherein each sensor array is a TDI sensor array.

14. The imaging system claim 1, wherein each sensor array is about 1,000 to 20,000 pixels wide.

15. The imaging system claim 1, wherein each sensor array is about 1,000 to 20,000 pixels wide and about 10 to 300 pixels long.

16. The imaging system claim 1, wherein each sensor array is about 8,000 pixels wide and about 128 pixels long.

17. The imaging system claim 1, wherein the sample stage is a motorized translation stage.

18. The imaging system claim 1, wherein the sample stage comprises a position encoder, wherein the position encoder generates a synchronization signal that synchronizes the transfer of the charges.

19. The imaging system claim 1, further comprising a collimating lens, a beam shaping lens, or a cylindrical lens.

20. The imaging system claim 1, further comprising one or more line generators.

21. A method of imaging a sample comprising:
a) directing a first excitation beam and a second excitation beam onto a sample, wherein said sample is on a sample stage moving at a sample stage speed, wherein the sample comprises a first fluorophore that generates a first fluorescent emission and a second fluorophore that generates a second fluorescent emission following interaction with a first excitation beam and a second excitation beam, respectively;

b) directing said first fluorescent emission to impinge upon and generate a first charge that transfers across a first sensor array at a first charge speed, and directing said second fluorescent emission to impinge upon and generate a second charge that transfers across a second sensor array at a second charge speed, wherein at least one of the first charge speed and the second charge speed is synchronized with the sample stage speed; and c) scanning the sample in a scan dimension and repeating step a) and step b) to form an image of the sample.

22. The method of claim 21, wherein the sample further comprises a third fluorophore that generates a third fluorescent emission and a fourth fluorophore that generates a fourth fluorescent emission following interaction with a first excitation beam and a second excitation beam, respectively; and directing said third fluorescent emission to impinge upon and generate a third charge that transfers across a third sensor array at a third charge speed, and directing said fourth fluorescent emission to impinge upon and generate a fourth charge that transfers across a fourth sensor array at a fourth charge speed.

23. The method of claim 22, wherein the method comprises imaging the sample comprising four different fluorophores simultaneously.

24. The method of claim 22, wherein the first excitation beam and the second excitation beam comprise an excitation line.

25. The method of one of claim 21, wherein scanning the sample comprises moving the sample stage.

26. The method of one of claim 21, wherein scanning the sample comprises moving the sample stage at a constant speed.

27. The method of one of claim 21, further comprising storing a data representation of said image of said sample in a computer readable memory.

28. The method of one of claim 21, wherein the excitation beam comprises UV radiation, VIS radiation, or IR radiation.

29. The method of one of claim 21, wherein the excitation beam comprises excitation beams having a wavelength of 405 nm, 470 nm, 488 nm, 514 nm, 520 nm, 532 nm, 561 nm, 633 nm, 639 nm, 640 nm, 800 nm, 808 nm, 912 nm, 1024 nm, or 1500 nm.

30. The method of one of claim 21, wherein the sample comprises modified nucleotides.

31. The method of one of claim 21, wherein the sample comprises an array having a plurality of individual sites.

* * * * *